United States Patent
Zielinski

(10) Patent No.: US 12,517,096 B2
(45) Date of Patent: Jan. 6, 2026

(54) SAMPLE MANAGER, SYSTEM AND METHOD

(71) Applicant: Waters Technologies Corporation, Milford, MA (US)

(72) Inventor: David Zielinski, Worcester, MA (US)

(73) Assignee: Waters Technologies Corporation, Milford, MA (US)

( * ) Notice: Subject to any disclaimer, the term of this patent is extended or adjusted under 35 U.S.C. 154(b) by 206 days.

(21) Appl. No.: 18/188,635

(22) Filed: Mar. 23, 2023

(65) Prior Publication Data

US 2023/0304972 A1 Sep. 28, 2023

Related U.S. Application Data

(60) Provisional application No. 63/323,255, filed on Mar. 24, 2022.

(51) Int. Cl.
  *G01N 30/06* (2006.01)
  *G01N 21/01* (2006.01)
  *G01N 30/02* (2006.01)

(52) U.S. Cl.
  CPC ............ *G01N 30/06* (2013.01); *G01N 21/01* (2013.01); *G01N 2030/027* (2013.01)

(58) Field of Classification Search
  CPC .. G01N 30/06; G01N 21/01; G01N 2030/027; G01N 30/24; G01N 35/1011; G01N 35/1079; G01N 30/18
  See application file for complete search history.

(56) References Cited

U.S. PATENT DOCUMENTS

| | | | | |
|---|---|---|---|---|
| 4,713,974 A | * | 12/1987 | Stone | G01N 30/24 73/864.23 |
| 5,133,392 A | * | 7/1992 | Hamann | G01N 35/1011 422/930 |
| 5,814,742 A | * | 9/1998 | Vissers | G01N 30/24 73/864.83 |
| 5,900,557 A | | 5/1999 | Tanihata et al. | |
| 6,171,280 B1 | * | 1/2001 | Imazu | G01N 35/1004 604/128 |

(Continued)

FOREIGN PATENT DOCUMENTS

WO  2017037770 A1  3/2017

OTHER PUBLICATIONS

International Search Report and Written Opinion in PCT/US2023/016018 mailed on Jun. 22, 2023.

(Continued)

*Primary Examiner* — David J Bolduc
(74) *Attorney, Agent, or Firm* — Schmeiser, Olsen & Watts LLP; Victor J. Baranowski, Esq.

(57) ABSTRACT

A method of aspirating a sample includes moving a sample needle downward to a first position so a tip of the sample needle touches a bottom of the sample container, determining that the tip of the sample needle is in the first position where the sample needle is in contact with the bottom of the sample container, after the determining that the tip of the sample needle is in contact with the bottom of the sample container, incrementally moving the sample needle upward from the first position, determining the sample needle has moved a predetermined distance upward from the first position and then aspirating a sample in the sample container.

19 Claims, 19 Drawing Sheets

(56) References Cited

U.S. PATENT DOCUMENTS

| | | | |
|---|---|---|---|
| 6,270,726 B1* | 8/2001 | Tyberg | G01N 35/1011 |
| | | | 73/304 C |
| 6,363,802 B1* | 4/2002 | Grippo | G01N 35/1011 |
| | | | 73/864.24 |
| 6,391,005 B1 | 5/2002 | Lum et al. | |
| 6,417,008 B2 | 7/2002 | Tyberg et al. | |
| 6,733,465 B1* | 5/2004 | Smutney | A61B 5/150732 |
| | | | 600/576 |
| 7,128,105 B2* | 10/2006 | Tribble | A61J 1/20 |
| | | | 604/416 |
| 7,900,658 B2* | 3/2011 | Osborne | B01F 35/422 |
| | | | 604/407 |
| 8,266,973 B2 | 9/2012 | Maeda et al. | |
| 9,389,239 B2 | 7/2016 | Maeda | |
| 9,720,009 B2 | 8/2017 | Tanaka | |
| 10,234,474 B2* | 3/2019 | Williams | B01L 3/527 |
| 2008/0063567 A1 | 3/2008 | Schacher et al. | |
| 2008/0142113 A1* | 6/2008 | Kiani | G01N 35/1002 |
| | | | 422/42 |
| 2009/0223012 A1 | 9/2009 | Hibe et al. | |
| 2009/0246085 A1* | 10/2009 | Watson | B01L 3/0293 |
| | | | 422/400 |
| 2010/0291668 A1* | 11/2010 | Bertrand | G01N 35/10 |
| | | | 435/287.2 |
| 2011/0091988 A1 | 4/2011 | Itoh | |
| 2012/0028343 A1* | 2/2012 | Kitagawa | G01N 35/00722 |
| | | | 422/561 |
| 2014/0304964 A1* | 10/2014 | Yeck | B01L 9/523 |
| | | | 33/545 |
| 2018/0217171 A1* | 8/2018 | Sasaki | B03C 1/01 |
| 2019/0120869 A1* | 4/2019 | Belz | G01N 35/1011 |
| 2019/0195905 A1* | 6/2019 | Iwasaki | B01L 3/0275 |
| 2020/0025722 A1* | 1/2020 | Simpson | G01N 30/16 |
| 2021/0293761 A1* | 9/2021 | Burnett | G01N 30/24 |
| 2021/0293762 A1 | 9/2021 | Burnett et al. | |
| 2021/0302395 A1* | 9/2021 | Cormier | G01N 35/04 |
| 2021/0302396 A1 | 9/2021 | Cormier et al. | |
| 2022/0178961 A1* | 6/2022 | Ezure | C12M 47/02 |
| 2023/0070054 A1* | 3/2023 | Kolbe | G01N 30/24 |

OTHER PUBLICATIONS

Kretz, et al. "A Compact, Programmable Sample Injector and Autosampler for Liquid Chromatography," Hewlett-Packard Journal, vol. 41, No. 2, pp. 17-23, Apr. 1, 1990.

International Preliminary Report on Patentability in PCT/US2023/016018 mailed on Oct. 3, 2024.

* cited by examiner

SAMPLE MANAGER, SYSTEM AND METHOD

RELATED APPLICATION

This application is a non-provisional patent application claiming priority to U.S. Provisional Patent Application No. 63/323,255, filed Mar. 24, 2022, titled "Sample Manage, System and Method," which is incorporated herein by reference.

FIELD OF THE INVENTION

The invention relates generally to liquid chromatography systems. More particularly, the invention relates to liquid chromatography sample managers, and associated systems and methods.

BACKGROUND

Chromatography is a set of techniques for separating a mixture into its constituents. For instance, in a liquid chromatography system, a pump takes in and delivers a mixture of liquid solvents to a sample manager, where an injected sample awaits its arrival. In an isocratic chromatography system, the composition of the liquid solvents remains unchanged, whereas in a gradient chromatography system, the solvent composition varies over time. The mobile phase, comprised of a sample dissolved in a mixture of solvents, passes to a column, referred to as the stationary phase. By passing the mixture through the column, the various components in the sample separate from each other at different rates and thus elute from the column at different times. A detector receives the elution from the column and produces an output from which the identity and quantity of the analysis may be determined.

Prior to being provided into the liquid chromatography system, the sample may be provided to a sample manager. The sample manager may be configured to prevent the sample from degrading or becoming otherwise damaged while providing the sample into the liquid chromatography system. Sample managers are regularly interacted with by technicians and as such must be user friendly, dependable, accurate, reliable, serviceable, and cost effective. Improved sample managers, systems and methods, would be well received in the art.

SUMMARY

In one embodiment, a method of aspirating a sample includes moving a sample needle downward to a first position so a tip of the sample needle touches a bottom of the sample container; determining that the tip of the sample needle is in the first position where the sample needle is in contact with the bottom of the sample container; after the determining that the tip of the sample needle is in contact with the bottom of the sample container, incrementally moving the sample needle upward from the first position; determining the sample needle has moved a predetermined distance upward from the first position; and after the determining the sample needle has moved the predetermined distance upward from the first position, aspirating a sample in the sample container.

Additionally or alternatively, the method further includes before the moving the sample needle downward to the first position so the tip of the sample needle touches the bottom of the sample container, using an optical sensor in determining a starting position of the sample needle system relative the sample container.

Additionally or alternatively, the method further includes using an optical detection system in determining that the sample needle has moved the predetermined distance upward from the first position.

Additionally or alternatively, the method further includes prior to moving the sample needle downward so the tip of the sample needle touches the bottom of the sample container: sensing, by the optical detection system, that a stripper foot is pressing upon a top of the sample container with a predetermined amount; and puncturing the top of the sample container with a puncture needle.

Additionally or alternatively, the determining the sample needle has moved the predetermined distance upward from the first position further comprises: sensing, by the optical detection system, that the stripper foot is pressing upon the top of the sample container.

Additionally or alternatively, a spring operably attached to the stripper foot deflects a predetermined amount.

Additionally or alternatively, the method further includes using an encoder system in moving the sample needle and determining that the tip of the sample needle is in contact with the bottom of the sample container.

Additionally or alternatively, the determining that the tip of the sample needle is in contact with the bottom of the sample container further comprises: moving the sample needle a pre-specified aspiration depth within the sample container; incrementally moving the sample needle downward toward the bottom of the sample container; and determining that an encoder output of a latter incremental step has not changed relative to an encoder output of a prior incremental step.

Additionally or alternatively, the method further includes reducing current in a motor controlling movement of the sample needle during the incremental moving the sample needle downward toward the bottom of the sample container.

Additionally or alternatively, the method further includes increasing the current in the motor controlling movement of the sample needle after the determining that the tip of the sample needle is in contact with the bottom of the sample container.

Additionally or alternatively, the method further includes accounting for a deflection of a sample platter upon which the sample container rests caused by contact of the tip of the sample needle touching the bottom of the sample container, prior to the aspirating the sample in the sample container.

Additionally or alternatively, the method further includes compensating for a relative position between the sample container and the sample platter in determining the predetermined distance upward.

Additionally or alternatively, a control system is configured to control the moving of the sample needle, the aspirating the sample, and configured to perform the determining that the tip of the sample needle is in contact with the bottom of the sample container and the determining that the sample needle has moved the predetermined distance upward from the first position.

Additionally or alternatively, the sample needle is included in a sample needle carriage assembly that includes a stripper foot, puncture needle and separate drive motors for the sample needle and the puncture needle.

Additionally or alternatively, a distance between the tip of the sample needle and the bottom of the sample container is less than 1.1 mm prior to the aspirating the sample.

Additionally or alternatively, the method further includes minimizing a residual volume to less than 1 uL by ensuring the tip of the sample needle remains within 1.1 mm from the bottom of the sample container prior during the aspirating the sample.

In accordance with another embodiment, a liquid chromatography system configured to perform the method. The liquid chromatography system includes: a solvent delivery system; a sample manager having a thermal chamber; a sampling mechanism mounted within the thermal chamber, the sampling mechanism including a sample platter mounted in the thermal chamber, and a sample delivery system in fluidic communication with solvent delivery system, the sample delivery system including the sample needle, the sample delivery system configured to transfer the sample from the sample container located in the sample platter into a chromatographic flow stream; a liquid chromatography column located downstream from the solvent delivery system and the sample delivery system; and a detector located downstream from the liquid chromatography column.

Additionally or alternatively, the liquid chromatography system further includes a control system that is configured to control the moving of the sample needle, the aspirating the sample, and configured to perform the determining that the tip of the sample needle is in contact with the bottom of the sample container and the determining that the sample needle has moved the predetermined distance upward from the first position.

In accordance with another embodiment, a sample manager is configured to perform the method. The sample manager includes a thermal chamber; and a sampling mechanism mounted within the thermal chamber, the sampling mechanism including a sample platter mounted in the thermal chamber, and a sample delivery system in fluidic communication with solvent delivery system, the sample delivery system including the sample needle, the sample delivery system configured to transfer the sample from the sample container located in the sample platter into a chromatographic flow stream.

Additionally or alternatively, the sample manager includes a control system that is configured to control the moving of the sample needle, the aspirating the sample, and configured to perform the determining that the tip of the sample needle is in contact with the bottom of the sample container and the determining that the sample needle has moved the predetermined distance upward from the first position.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
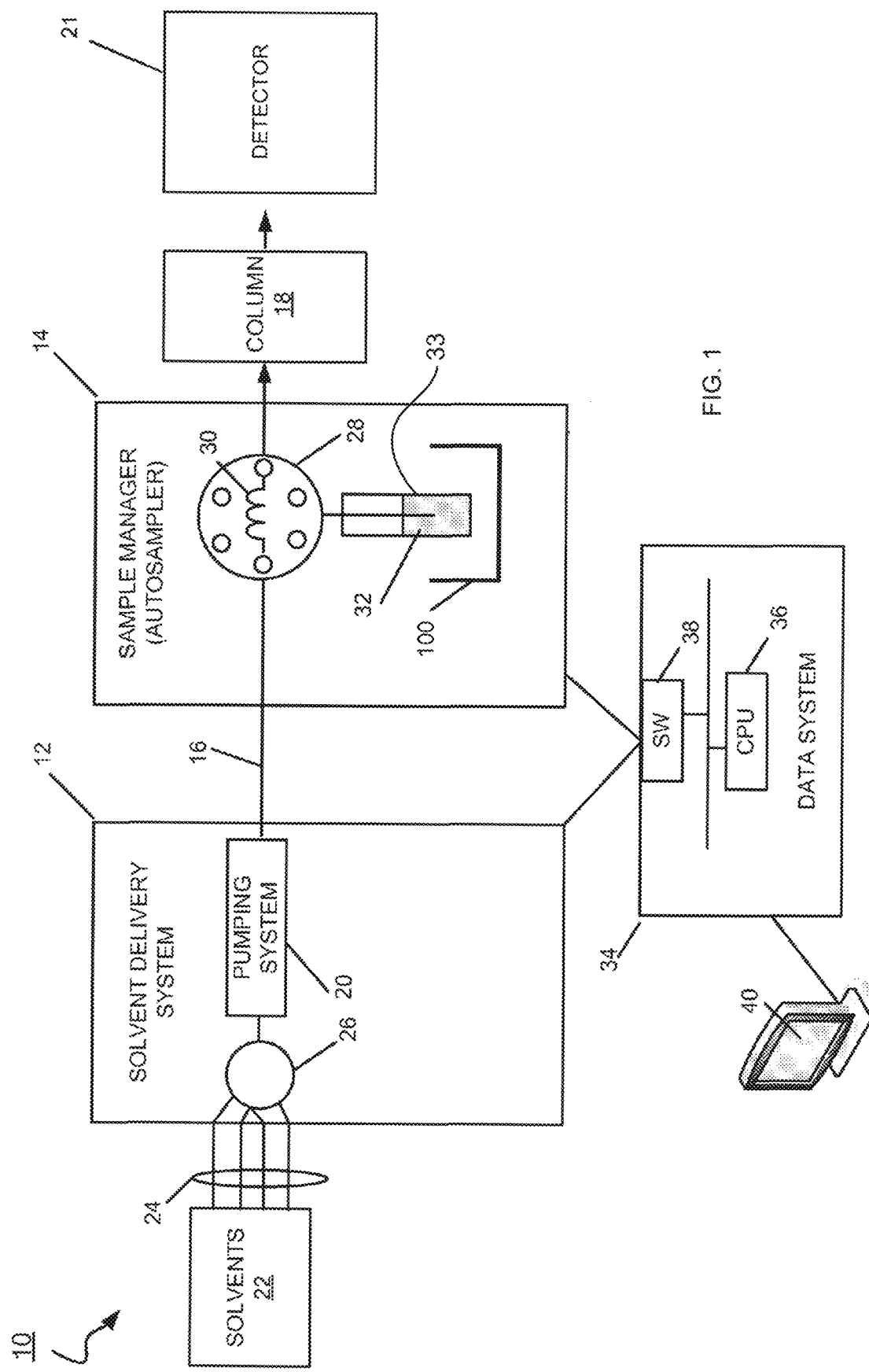
FIG. 1 depicts a schematic view of a liquid chromatography system including a sample manager in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

The present invention will describe a system for aspirating a sample from a sample vial which allows for the sample needle to achieve a very close tip distance with a bottom of a sample needle. Methods described herein may allow a liquid chromatography system, such as one of the systems described herein, to obtain knowledge of an exact location of a bottom of a sample container or vial, and thereby position the tip of the sample needle immediately proximate the bottom for aspiration of a sample. More particularly, the tip may be configured to be located an exact predetermined distance from the bottom of the sample vial or container during aspiration. While the present invention is described by reference to an exemplary liquid chromatography system with an exemplary sample chamber and sample platter arrangement, it should be understood that the inventive methodology described herein may be applied to any liquid chromatography system.

In an exemplary embodiment, prior to performing a liquid chromatography run, a technician loads an array of vials containing samples onto a sample-vial carrier, places the sample-vial carrier onto a drawer, and slides the drawer into a bay within a sample platter of a thermal chamber of a sample manager system. The sample manager system may include a sample delivery system that is configured to transfer the sample from the sample-vial carrier into a chromatographic flow stream. The sample chamber may be a thermal chamber that includes a sampling mechanism which includes a rotating sample platter with improved sample capacity and sampling accuracy. A sampling needle as a part of the sampling mechanism is located on a rotating needle arm that, in combination with the rotating sample platter, provides complete needle coverage over the bays within the sample platter. While this particular form of needle arm provides good coverage of a sample platter and allows a sample needle to interact with sample containers on any place above the platter, other platter and sample needle arrangements are contemplated with various designs. The structure of the sample chamber and sample needle described herein is exemplary.

The features of the sample delivery system and sample manager thermal chamber described herein may be applicable to any liquid chromatography system configured to deliver samples into a chromatographic flow stream. As one example, FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In one embodiment, the pumping system 20 is embodied by a low-pressure mixing gradient pumping system having two pumps fluidically connected in series. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient).

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY® Binary Solvent Manager and the ACQUITY® Quaternary Solvent Manager, manufactured by Waters Corp. of Milford, Mass.

The sample manager 14 may include an injector valve 28 having a sample loop 30. The sample manager 14 operates in one of two states: a load state and an injection state. In the load state, the position of the injector valve 28 is such that the sample manager loads the sample into the sample loop 30. The sample is drawn from a vial contained by a sample vial carrier. "Sample vial carrier" herein means any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 further includes a data system 34 that is in signal communication with the solvent delivery system 12 and the sample manager 14. The data system 34 has a processor 36 and a switch 38 (e.g. an Ethernet switch) for handling signal communication between the solvent delivery system 12 and sample manager 14, as described herein. Signal communication among the various systems and instruments can be electrical or optical, using wireless or wired transmission. A host computing system 40 is in communication with the data system 34 by which a technician can download various parameters and profiles (e.g., an intake velocity profile) to the data system 34.

Figure 2:
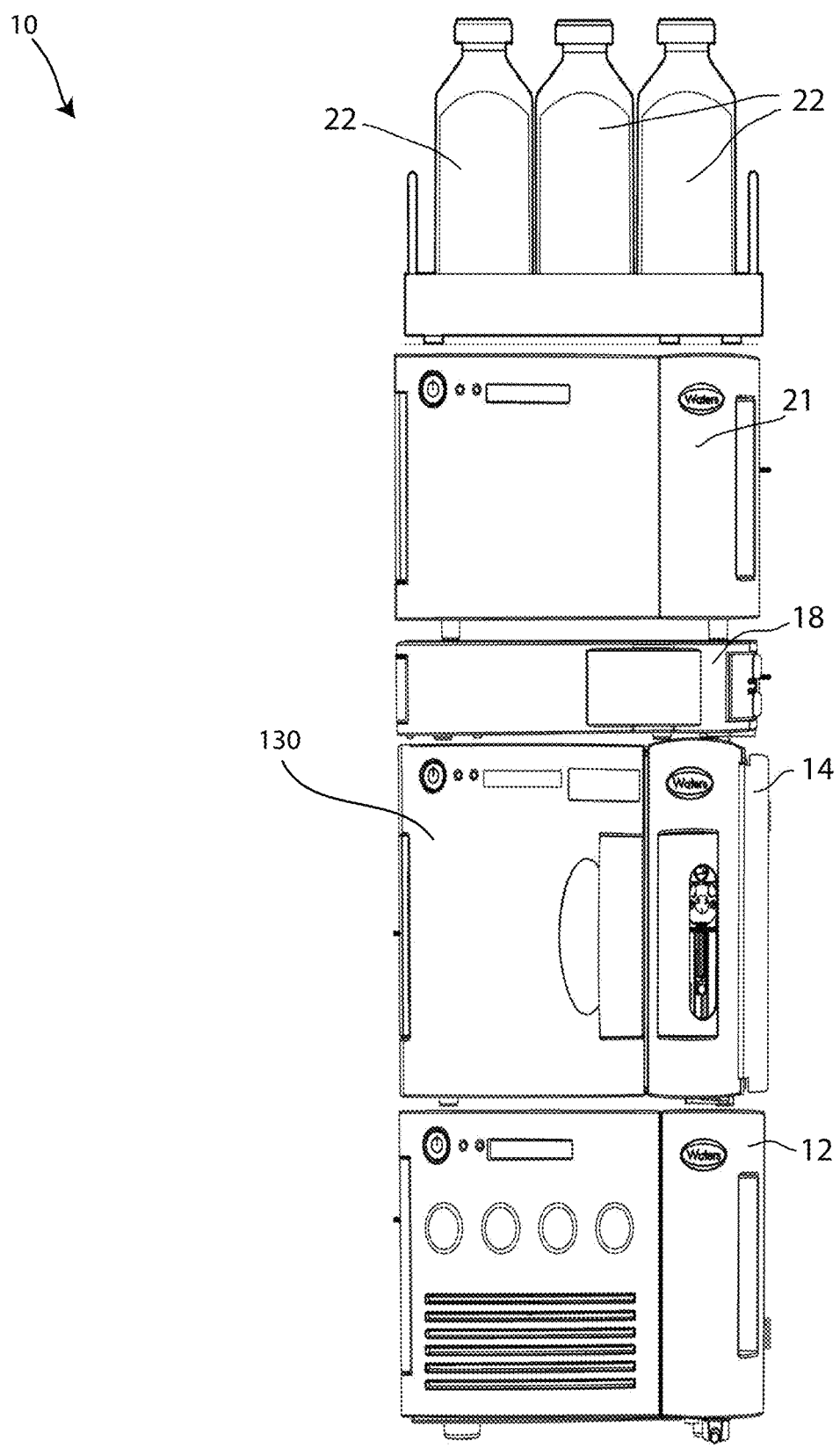
FIG. 2 depicts a perspective view of a liquid chromatography system including the sample manager of FIG. 1 in accordance with one embodiment.

FIG. 2 shows a perspective view of the liquid chromatography system 10 including the sample manager 14, the detector 21, the chromatographic column 18, the solvent delivery system 12, and the solvents 22. Each of the sample manager 14, the detector 21, the chromatographic column 18, the solvent delivery system 12 may include a housing or body within which the various features may be housed, such as the data system 34, the sample loop 30 and injector valve 28, the pumping system 20, the mixer 26 and the tubing 24. The various components 12, 14, 18, 19, 21, 22 may be interconnected with fluidic tubes and in signal communication to the data system 34 of the system. The liquid chromatography system 10 is shown with the solvent delivery system 12, sample manager 14, chromatographic column 18, detector 21 and a tray for holding the solvents 22 stacked together.

Figure 3:
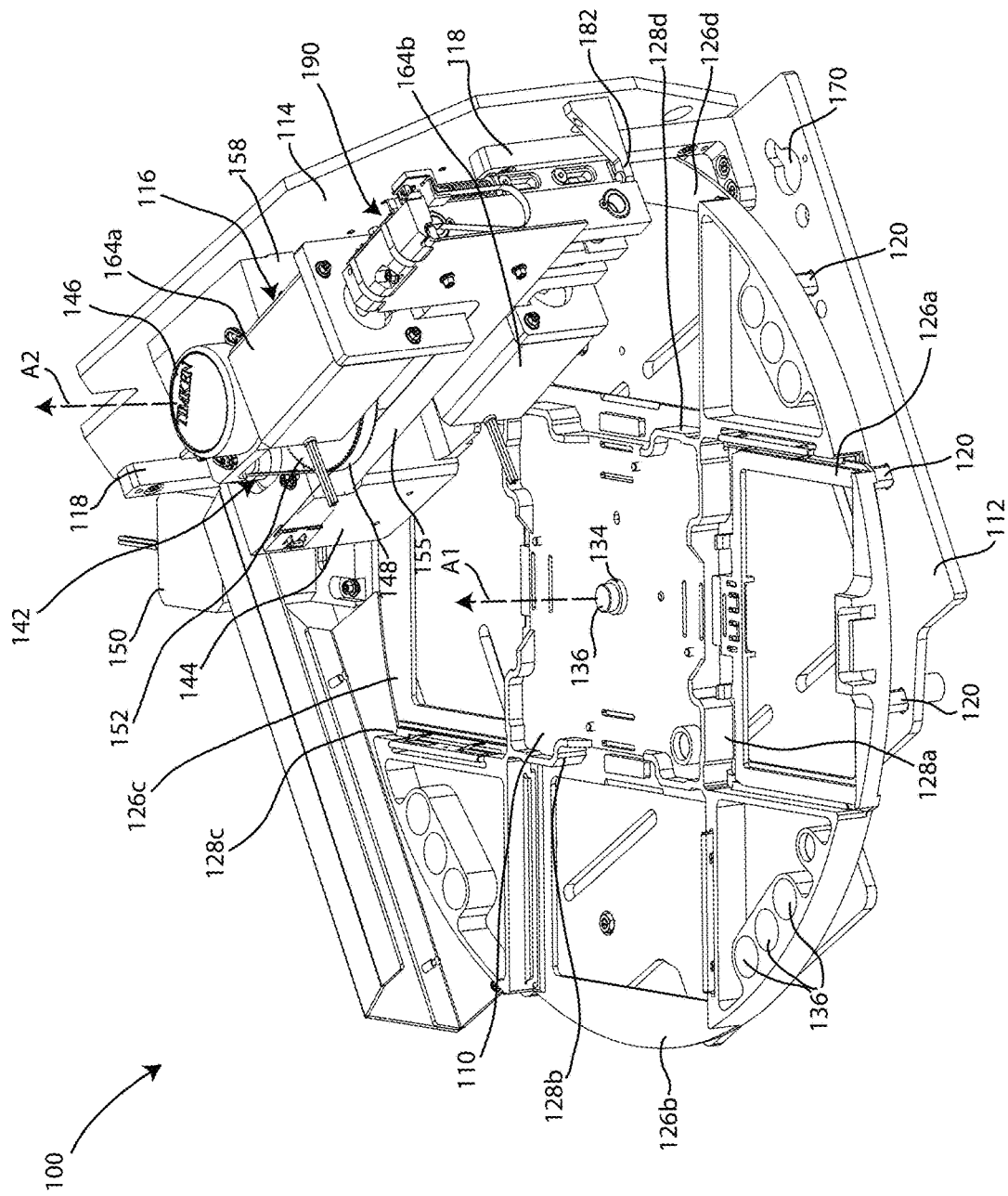
FIG. 3 depicts a perspective view of an interior of the sample manager of FIGS. 1 and 2, in accordance with one embodiment.

FIG. 3 depicts a perspective view of the sampling mechanism 100 of the sample manager 14 of FIGS. 1 and 2, in accordance with one embodiment. As shown the sampling mechanism 100 includes a sample platter 110 attached to datum base 112. A vertical frame 114 is attached and extends perpendicular from the datum base 112. A needle arm 116 is attached to the vertical frame 114. The needle arm 116 includes a puncture needle 122 (shown in FIG. 4) and a sample needle (not shown) as part of a sample delivery system that is in fluidic communication with the solvent delivery system 12. The sample needle may be configured to obtain or otherwise draw the sample from a sample vial. Thereafter, the sample delivery system of the liquid chromatography system 10 is configured to transfer the sample into a chromatographic flow stream and to the column 18 located downstream from the sample delivery system, and then to the detector 21 located downstream from the column 18. The sample vial may be one of many vials located within up to four sample vial carriers (not shown), located on the sample platter 110.

The sample platter 110 may be configured to rotate 360 degrees about a first vertical axis A1 while the needle arm 116 is configured to at least partially rotate about a second vertical axis A2. These two rotations may provide for sufficient coverage by the needle arm 116 across all the sample vial carriers within the sample platter 110. The rotating needle arm 116, in combination with the rotation of the sample platter 110, may thereby be configured to move the sample needle 122 into position to access any location on the sample platter 110 that holds a sample vial within a sample vial carrier.

As shown, the sample platter 110 includes a circular frame that includes four bays—a first carrier bay 126a, a second carrier bay 126b, a third carrier bay 126c, and a fourth carrier bay 126d. The carrier bays 126a, 126b, 126c, 126d are disposed equidistant about a perimeter of the circular sample platter 110. In other words, the carrier bays, 126a, 126b, 126c, 126d are disposed circumferentially 90 degrees from each other about the circular sample platter 110. As described above, the rotating needle arm 116, in combination with the rotation of the sample platter 110, is configured to move the sample needle 122 directly above any location covered by the respective perimeters of the respective carrier bays 126a, 126b, 126c, 126d. The platter can include four bays as shown but may also include three bays or extended to even more than four bays in other embodiments. The bays may be equidistant from each other or may be staggered in other manners about the circumference of the circular sample platter 110.

Each of the carrier bays 126a, 126b, 126c, 126d is shown as a drawer that slides into and out of a bay drawer receiver 128a, 128b, 128c, 128d. The carrier bays 126a, 126b, 126c, 126d may be configured to be pulled from respective bay drawer receivers 128a, 128b, 128c, 128d radially outwardly in order to facilitate ease of loading of sample vial carriers into and out a front door 130 of the sample platter (shown in FIG. 2). The integration of the carrier bays 126a, 126b, 126c, 126d and the respective bay drawer receivers 128a, 128b, 128c, 128d may be configured to stop the carrier bays 126a, 126b, 126c, 126d before the carrier bays 126a, 126b, 126c, 126d become fully disconnected from the bay drawer receivers 128a, 128b, 128c, 128d. Alternatively, the bezel of the sampling mechanism 100 may include a structure that prevents the carrier bays 126a, 126b, 126c, 126d from becoming fully disconnected from the bay drawer receivers 128a, 128b, 128c, 128d.

The carrier bays 126a, 126b, 126c, 126d are each configured for receiving sample vial carriers. The sample manager 100 may be configured to receive and process samples within all four carrier bays 126a, 126b, 126c, 126d. In addition to sliding in and out of the bay drawer receivers 128a, 128b, 128c, 128d via a track system, the carrier bays 126a, 126b, 126c, 126d may include magnets positioned underneath that are configured to magnetically retain the sample vial carriers into position within the carrier bays 126a, 126b, 126c, 126d. Corresponding magnets may be located a radially inward position within the carrier bays 126a, 126b, 126c, 126d to further ensure that the carrier bay 126a, 126b, 126c, 126d is in position properly (i.e. fully inserted) relative to the bay drawer receivers 128a, 128b, 128c, 128d. Leaf springs 132 may be configured to bias received sample platters toward the left most wall of the respective carrier bays 126a, 126b, 126c, 126d, while the magnetic structure retains the received sample platters against the radially inward wall of the respective carrier bays 126a, 126b, 126c, 126d.

The sample platter 110 includes a middle opening 134 for receiving a post 136 around which the sample platter 110 is configured to rotate about the vertical axis A1. The sample platter 110 further includes additional openings 136 disposed around the perimeter in between the carrier bays 126a, 126b, 126c, 126d configured to receive and hold larger single individual vials (not shown) or other samples. The needle arm 116 (and the needle thereof) may be configured to be positioned over each of the perimeter additional openings 136.

The sample platter 110 is shown mounted to the datum base 112. The datum base 112 may be a metallic plate that is mounted to a thermal chamber frame (not shown) within the sample manager 14. The datum base 112 may include openings through which deflection limiting columns 120 extend. The deflection limiting columns 120 may be configured to prevent deflection of the sample platter 110 beyond a specific distance relative to the datum base 112 before being stopped. The deflection limiting columns 120 may be keyed to a channel in the bottom of the sample platter 110 and may act as bearings to allow rotation of the sample platter 110 about the datum base 112. Rotation of the sample platter 110 about the datum base 112 may be created by a motor 150 disposed on the datum base 112 proximate the perimeter of the sample platter 110. The datum base 112 further includes a plurality of threaded openings configured to receive bolts for attaching a right-angle bracket 118 thereto at each side. The right-angle brackets 118 may be configured to attach the vertical frame 114 to the datum base 112 in a perpendicular orientation. An encoder (not shown) may further be attached to the sample platter 110 to maintain positioning of the sample platter 110 relative to the datum base 112.

The vertical frame 114 is attached to the datum base 112 such that the vertical frame 114 extends through the circumference of the sample platter 110. To account for this location being over the sample platter 110, the vertical frame 114 includes an opening 140 (shown in FIG. 4) or cutout through which the sample platter 110 and any received sample vial carrier and any received sample vials are configured to pass. The opening 140 is dimensioned tall enough to receive a tall sample vial carrier without causing interference. The vertical frame 114 creates a surface over the opening 140 upon which to mount the needle arm 116.

The needle arm 116 is shown including a drive mechanism 142 and a motor 144. The motor 144 is configured to rotate about an axis that rotates a belt 148, which in turn rotates a pulley 152. Rotation of the pulley 152 may be configured to impart rotation of the needle arm 116 about the second vertical axis A2. The rotation of the needle arm 116 may be independent rotation relative to the rotation of the sample platter 110, and may be rotation about a different vertical axis A2 than the vertical axis A1 about which the sample platter 110 rotates.

Figure 4:
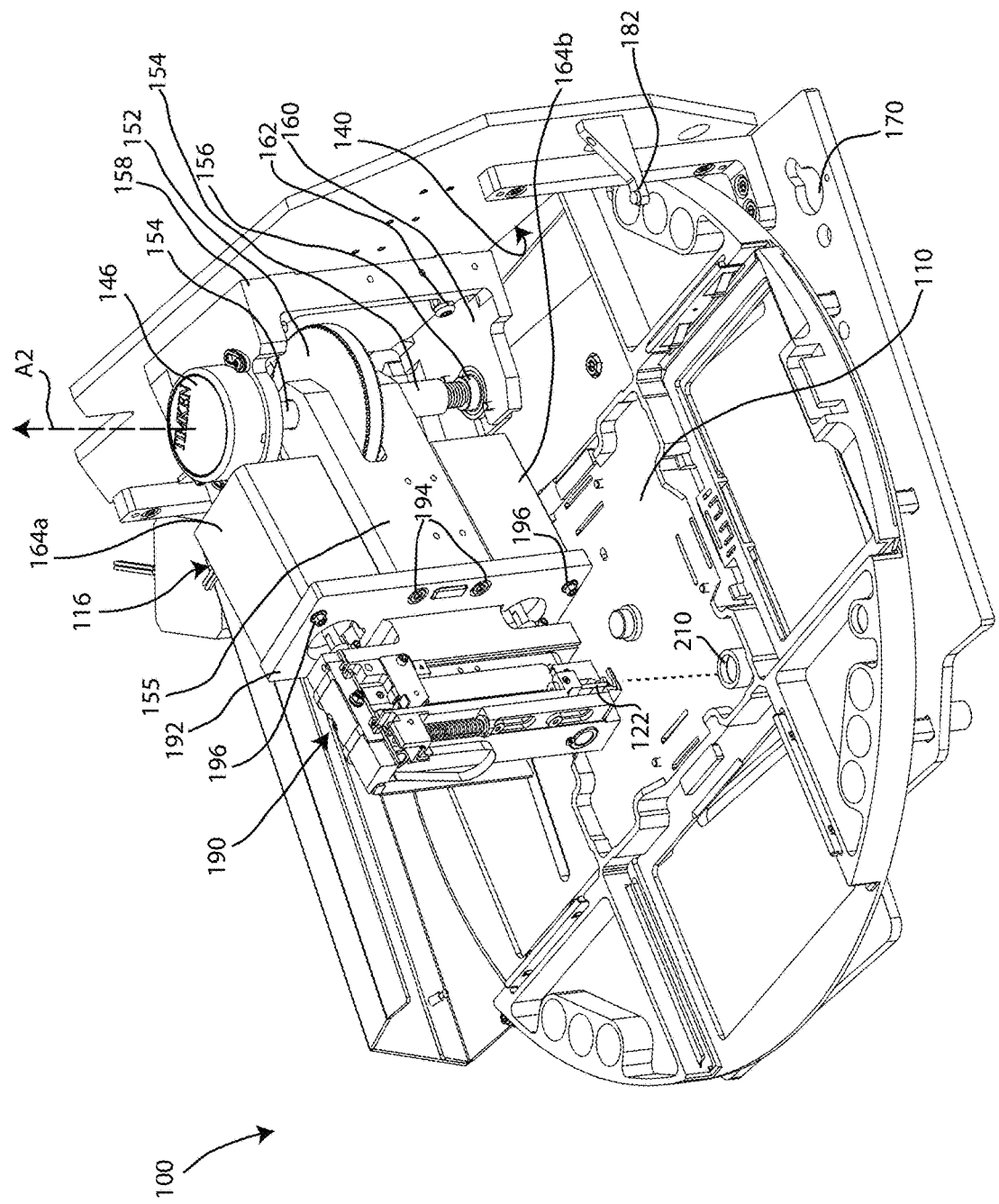
FIG. 4 depicts a perspective view of the interior of the sample manager of FIGS. 1 and 2 in a first calibration position, in accordance with one embodiment.

Referring now to FIG. 4, a perspective view of the interior of the sample manager 14 of FIGS. 1 and 2 is shown in a first calibration position, in accordance with one embodiment. The first calibration position shown in FIG. 4 is a position where the needle arm 116 is rotated counter clockwise about the second vertical axis A2 relative to the position shown in FIG. 3. As shown, a shaft 154 extends through the pulley 152 that is attached and configured to rotate with the pulley 152. The shaft 154 is connected to a rotating plate 155 that is configured to rotate with the shaft 154 and impart rotation on a needle assembly 190. The shaft 154 includes a biasing spring 232. A removable needle arm housing 158 is attached to the vertical frame 114. The removable needle arm housing 158 includes a horizontal plate 160 extending from just above the opening 140 in the vertical frame 114. The horizontal plate 160 includes a bushing 156 configured to receive the base of the shaft 154 and maintain the shaft 154 in alignment with the second vertical axis A2. The needle arm housing 158 is removably attached to the vertical frame 114 with a plurality of accessible bolts 162. The accessible bolts 162 are accessible through the door 130 of the sample manager 14. This may allow the entirety of the vertical frame 114 and the needle arm 116 and all of the components thereof to be easily removable through the door 130 during maintenance or part replacement.

The needle arm 116 further includes a magnetic encoder 146. The magnetic encoder 146 may be configured to determine rotational position of the needle arm 116 to whatever tolerance is necessary for accurate positioning of the sample needle 122. Likewise, the motor 150 may be equipped with an encoder for determining the rotational position of the sample platter 110. The two encoders in the system may be in communication with a control system (e.g. data system 34) for calibrating and controlling movement of the needle arm 116 and the sample platter 110. While magnetic encoders may be utilized, other encoders are contemplated, such as optical encoders.

The needle arm 116 is shown including two separate motors 164a, 164b configured to rotate two separate drive shafts. A first motor 164a is configured to rotate a first drive shaft 236 (shown in FIGS. 6 and 8) that enacts movement on the puncture needle 122. A second motor 164b is configured to rotate a second drive shaft 238 (shown in FIGS. 6 and 8) that enacts movement on a sample needle (not shown). The first and second motors 164a, 164b may be attached to the needle arm 116 such that the motors 164a, 164b rotate with the needle arm 116. The puncture needle 122 may operate in conjunction with the sample needle in order to puncture whatever material or membrane covers a sample vial. The two motors 164a, 164b may be configured to operate independently and may be controlled and programed by the control system and/or data system 34 for operational routines.

The needle assembly 190 of the needle arm includes a plate 192 having two accessible bolts 194 which may be accessible by a technician that opens the door 130 of the sample manager 14. Upon unbolting the accessible bolts 194, the technician may remove the needle assembly 190 and the attached motors 164a, 164b from the needle mechanism base 230. The needle assembly 190 and the motors 164a, 164b may be removable through the door 130 of the sample manager 14 without removing the needle mechanism base 230. Similarly, the motors 164a, 164b may be easily removed from the needle arm 116 by removal of one or more accessible motor bolts 196 from the plate 192. This may allow for the motors 164a, 164b to be easily replaced or removed for maintenance through the front door 130 of the sample manager 14 without removal of other components of the needle arm 116.

The sample delivery system may further include a fluidic tube (not shown) located between the sample needle and the liquid chromatography column 18. The fluidic tube may include a coiled portion configured to expand and contract during rotation of the needle arm 116 about the second vertical axis A2. The coiled portion may extend between the top of the needle arm 116 above the puncture needle 122 and to the vertical frame 114. The coiled portion may uncoil when the needle arm 116 rotates away from the vertical frame 114 and recoils when the needle arm 116 rotates toward the vertical frame 114. The coiled portion of the fluidic tube may be spiraled, bent, or otherwise curled in order to provide for lengthwise expansion and contraction in a predictable manner that does not interfere with the other movement of the various components within the sample manager 14.

Referring back to FIG. 3, the needle arm 116 is shown in this view having been rotated to a home position, whereby a projecting stop 182 that is connected to, coupled to, or integrated into, the vertical frame 114 is contacted with the needle assembly 190. The home position may be a position that is rotated to a stopping point, past which the needle arm 116 may not be capable of rotating. As shown, at the home position the needle arm 116 is rotated in a clockwise direction to a point of maximum rotation whereby the needle arm 116 is stopped from further clockwise rotation by the projecting stop 182.

Attached to the datum base 112 may be a needle wash system (not shown) extending from an opening 170 located in the datum base 112 near the home position or location. The needle wash system may include a plurality of liquid source tubes each configured to introduce water and/or other cleaning agent(s) to wash the sample needle 122 and/or the puncture needle when the needles are moved over the needle wash system. A wash process may include, for example, providing a first cleaning agent to the sample needle 122 from a first of the liquid source tubes, and then moving the sample needle 122 over the second of the liquid source tubes to be cleansed with water. Other wash processes and structure are contemplated as would be appropriate to wash needle(s) in the needle arm 116.

The needle arm 116 may be configured to rotate about the rotating shaft 154 and the second axis A2 an amount that allows complete coverage of the needle assembly 190 over the entirety of the working portion of the sample platter 110. The needle arm 116 may be configured to rotate more than 45 degrees but less than 90 degrees in the embodiment shown. Additional rotational movement than what is shown (i.e. equal to or greater than 90 degrees) is also contemplated in other embodiments.

Figure 5:
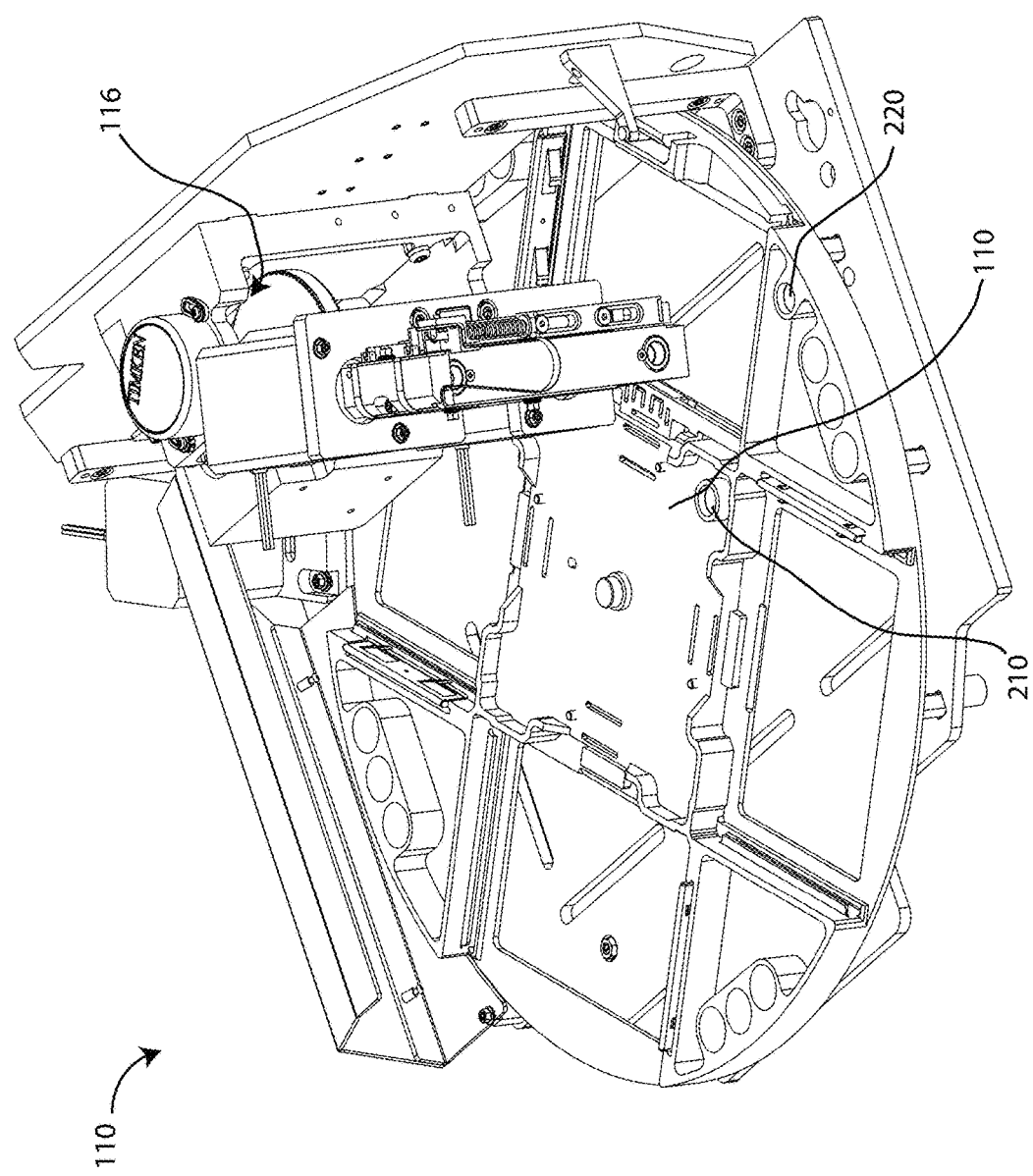
FIG. 5 depicts a perspective view of the interior of the sample manager of FIGS. 1 and 2 in a second calibration position, in accordance with one embodiment.

Referring to FIGS. 4 and 5, the interior of the sample manager 14 of FIGS. 1 and 2 is shown with the needle arm 116 located in two calibration positions, in accordance with one embodiment. In various contemplated embodiments, various calibration systems are contemplated. FIGS. 4 and 5 shown one exemplary calibration system in which the data system 34 and/or sample manager control system may be configured to calibrate the sampling mechanism 100 to use. One calibration process may include a first step, shown in FIG. 4, of moving the sample platter 110 and the needle arm 116 to align the needle with the first opening 210 in the sample platter and then recording a first encoder position of each the sample platter 110 and the needle arm 116. For example, the needle arm 116 may move counter-clockwise from the home position (shown in FIG. 3) to the position shown in FIG. 4 so that the puncture needle 122 (or sample needle) is directly above the first opening 210.

The calibration process may then include a second step of moving the sample platter 110 and the needle arm 116 to the position shown in FIG. 5, in order to align the puncture needle 122 (or sample needle) with the second opening 220 in the sample platter. The calibration process may then include recording a second encoder position of each the sample platter 110 and the needle arm 116. With the known first and second encoder positions, the data system 34 and/or sample manager control system may be configured to back-calculate the geometric parameters of the sampling mechanism 100 and thereby calibrate the movement and position of the sample platter 110 and the needle arm 116. The positional accuracy may be more precise than a typical prior art calibration process, as the inventive process described above does not rely on assumed geometric qualities being within a certain level of tolerance.

Figure 6:
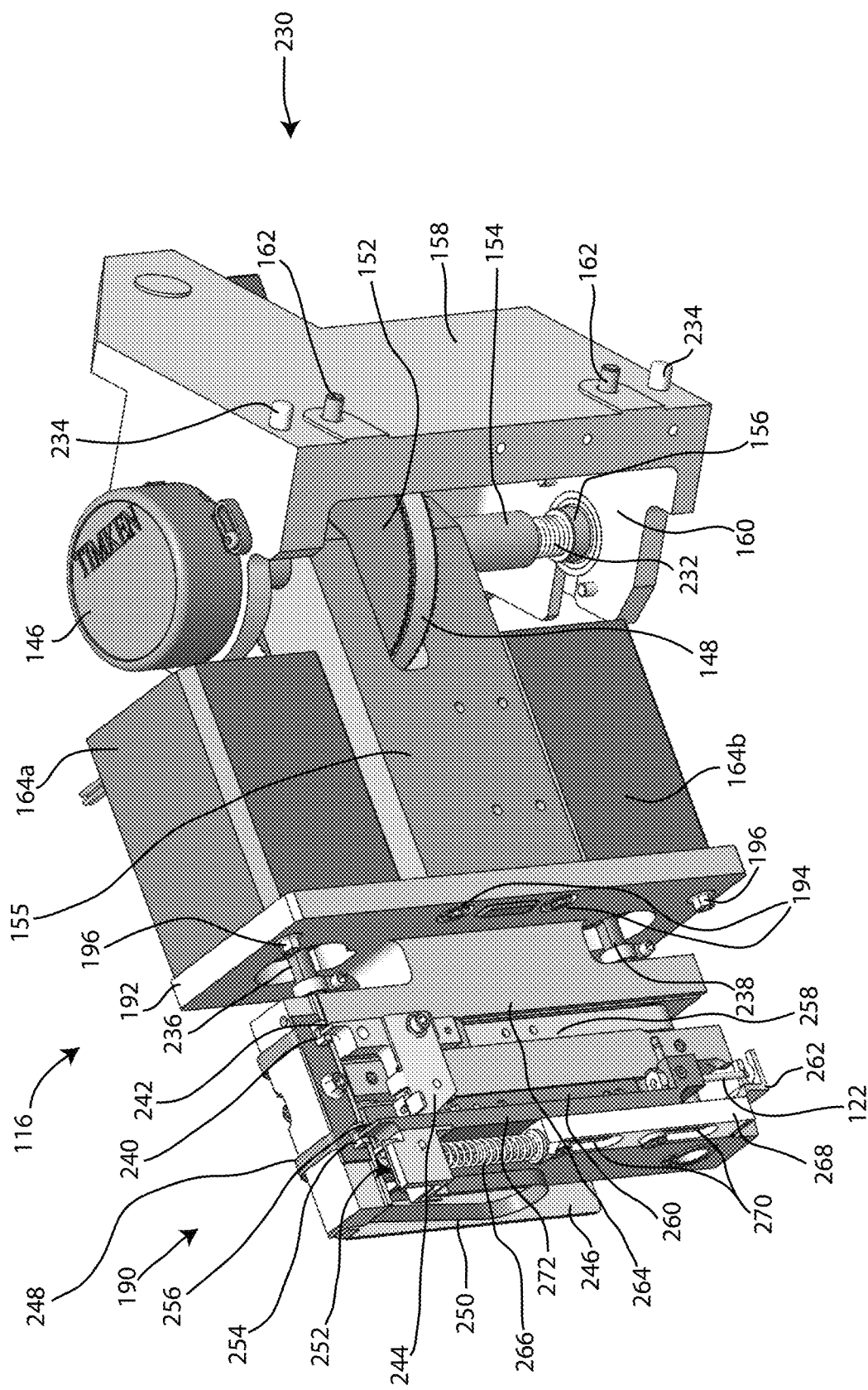
FIG. 6 depicts a perspective view of a needle arm detached from an interior of a sample manager, in accordance with one embodiment.

FIG. 6 depicts a perspective view of the needle arm 116 detached from the interior of the sample manager 14, in accordance with one embodiment. As shown, the needle arm 116 includes a base 230 that is removably attachable to the sample manager 14 of the liquid chromatography system 10. The needle arm 116 further includes the needle assembly 190 that is removably attachable to the base 230. The removability of each of the base 230 from the sample manager 14 and the needle assembly 190 from the base 230 may be provided by accessible bolts, screws, pins or other easily accessible, engageable and/or disengageable coupling devices. The attachable removability of each of these components as described herein provides for ease of servicing and replacing components of the needle arm 116 through a front door of the sample manager 14. Further, as described above, the needle arm 116 includes sufficient structure to provide for rotational movement of the arm about a vertical axis when the needle arm 116 is attached within a sample manager 14.

Figure 7:
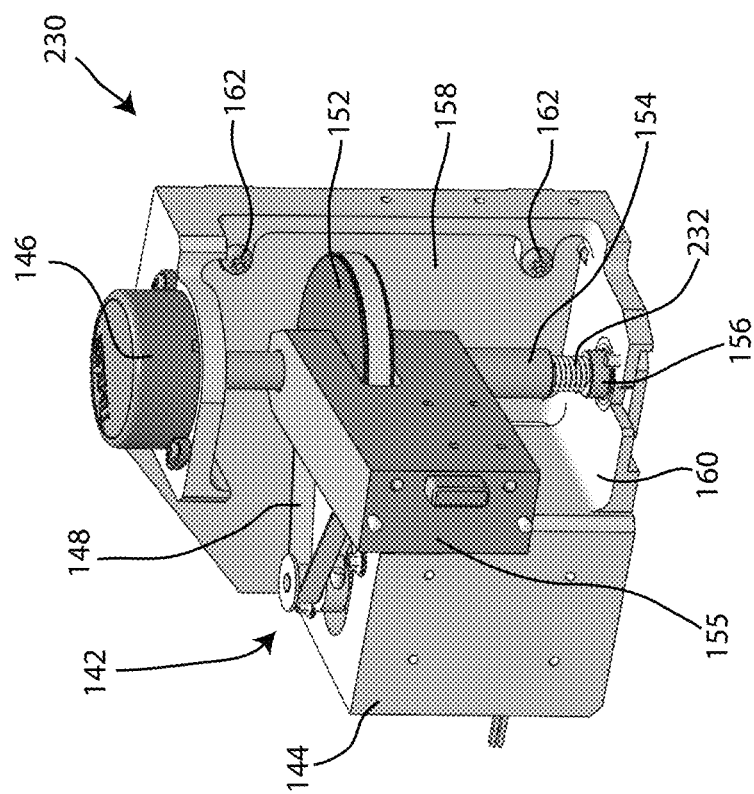
FIG. 7 depicts a perspective view of the needle arm of FIG. 6 with a needle assembly detached, in accordance with one embodiment.

FIG. 7 depicts a perspective view of the base 230 of the needle arm of FIG. 6 with the needle assembly 190 detached, in accordance with one embodiment. The base 230 includes the removable needle arm housing 158. The removable needle arm housing 158 provides a frame for attaching the base 230 to the interior of the sample manager 14 of the liquid chromatography system 10, such as by attachment of the removable needle arm housing 158 to the vertical frame 114. The removable needle arm housing 158 includes a flat vertical surface configured to abut the flat vertical surface of the vertical frame 114. As shown in FIG. 6, a plurality of alignment pins 234 located on a back surface of the needle arm housing 158 act in cooperation with the accessible bolts 162 to attach the flat vertical surface of the needle arm housing 158 with the flat vertical surface of the vertical frame 114. While not shown, the vertical frame 114 may include corresponding bores, or female receiving openings for receiving each of the accessible bolts 162 and alignment pins 234.

As shown, the base 230 includes the shaft 154 that is configured to rotate about the vertical axis A2. The removable needle arm housing 158 is configured to hold the shaft 154 at both a top location and a bottom location, while allowing the shaft 154 to rotate about the removable needle arm housing 158. Specifically, the removable needle arm housing 158 includes the lower horizontal plate 160 and an upper horizontal plate 161 extending from the flat vertical surface of the removable needle arm housing 158. The bushing 156 is disposed with an opening at the lower horizontal plate 160 allowing the shaft 154 to rotate therein.

The base 230 further includes the motor 144, the drive mechanism 142, the belt 148, the pulley 152, and the rotating plate 155. The drive mechanism 142 of the motor 144 may be a drive shaft, or the like, that the motor 144 is configured to cause to rotate. Rotation of the drive mechanism 142 further causes movement of the belt 148 and thereby rotation of the pulley 152 that is attached to the vertical shaft 154. The rotating plate 155 is attached to the shaft 154, and is configured to rotate with rotation of the shaft 154.

Figure 8:
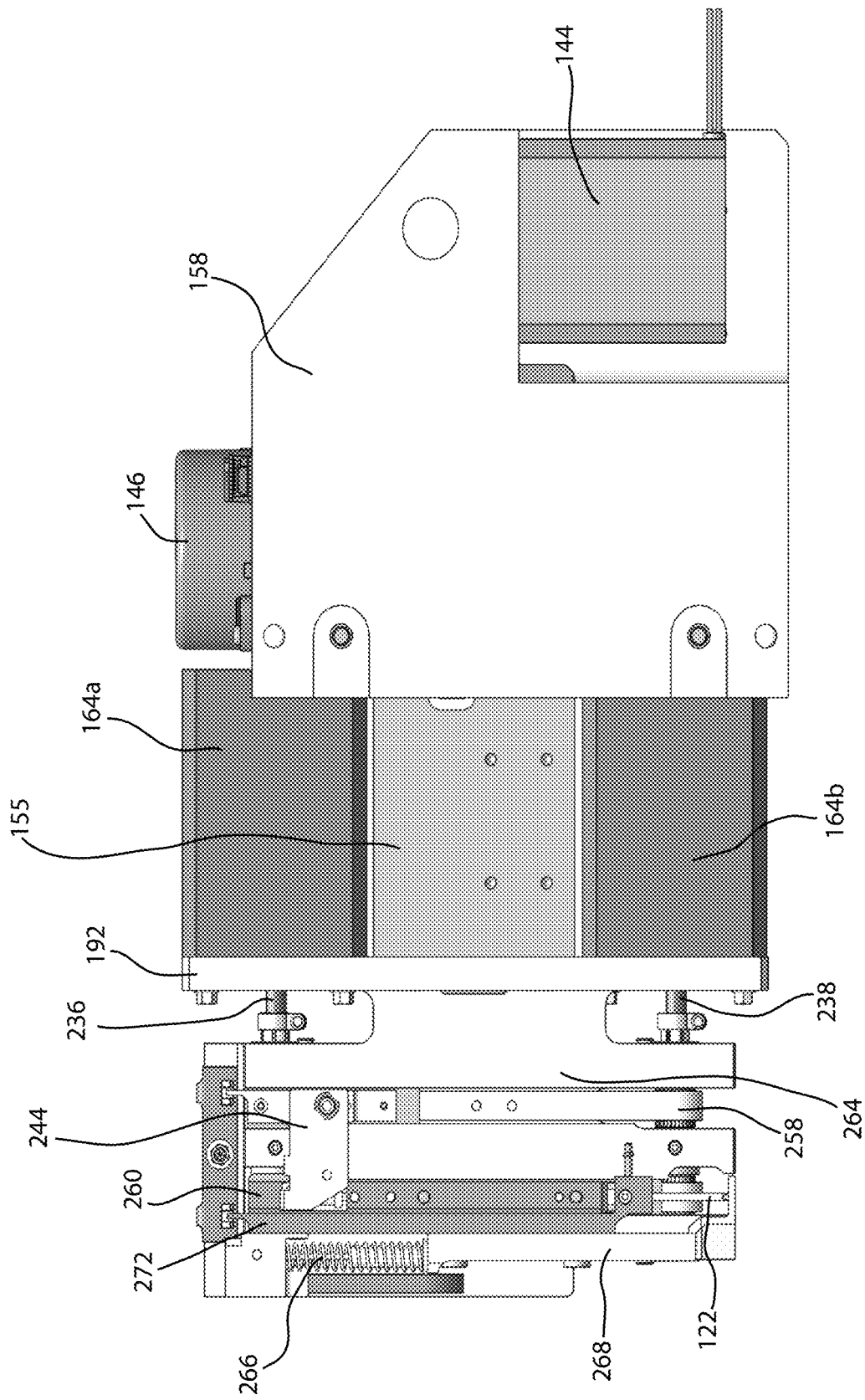
FIG. 8 depicts a side view of the needle arm of FIG. 6, in accordance with one embodiment.

FIG. 8 depicts a side view of the needle arm 116 in accordance with one embodiment including both the needle assembly 190 and the base 230. Referring to both the perspective view of FIG. 6 and the side view of FIG. 8, the base 230 is shown including each of the motor 144, the magnetic encoder 146, the housing 158 and the rotating plate 155. The needle assembly 190 includes a housing 264 or other body upon which the components of the needle assembly 190 are attached. As shown, the plate 192 of the housing 264 of the needle assembly 190 is attached to the base 230, and specifically to the rotating plate 155.

The needle assembly 190 includes a drive system. The drive system includes a first motor having a first drive shaft 236 attached to a top of the plate 192 of the housing 264. The needle assembly 190 further includes a second motor 164b having a second drive shaft 238 attached to a bottom of the plate 192 of the housing 264. The first motor 164a and first drive shaft 236 are configured to impart vertical motion or movement on the puncture needle 122 via imparting vertical motion or movement on a puncture needle axis 260. Likewise, the second motor 164b and the second drive shaft 238 are configured to impart vertical motion or movement on a sample needle via imparting vertical motion or movement on a sample needle axis 258.

Further, a stripper foot 262 is attached to a stripper foot axis 268 that includes a spring loaded end 266 having a spring mechanism. The spring mechanism may be configured to compress during downward movement of the stripper foot 262 and stripper foot axis 268. In use, the stripper foot 262 may contact the top of a sample vial (not shown), after which the puncture needle 122 may be pushed through a protective membrane of the sample vial. After the puncture needle 122 has punctured this top protective membrane, the puncture needle 122 must be retracted from the sample vial and protective membrane. The stripper foot 262 may be configured to provide a downward force on the top of the sample vial so that the puncture needle 122 may be retracted properly without sticking to the protective membrane of the sample vial. The stripper foot 262 includes an opening through which the puncture needle 122 is configured to extend during puncturing.

As shown in FIG. 6, the stripper foot axis 268 is movable relative to the puncture needle axis 260, via two couplings 270. The couplings 270 may include a top elongated vertical opening and a bottom elongated opening in the stripper foot axis 268 through which top and bottom respective pins extend. The top and bottom respective pins are attached to a puncture needle coupling surface 272 of the puncture needle axis 260. The top and bottom elongated vertical openings cooperate with the pins so that the stripper foot axis 268 and the puncture needle axis 260 are connected or otherwise coupled in a manner that allows for vertical movement between the stripper foot axis 268 and the puncture needle axis 260. The maximum vertical movement between the stripper foot axis 268 and the puncture needle axis 260 is defined by the vertical length of the top and bottom elongated vertical openings in the stripper foot axis 268.

The sample needle is located along the same vertical axis as the puncture needle 122. The sample needle may be a needle having a smaller diameter than the puncture needle 122 such that the sample needle is configured to extend through the larger diameter opening of the puncture needle 122. A needle holder 244 is located at a top of the sample needle axis 258. The sample needle holder 244 may be configured to removably receive the sample needle at a location that aligns the sample needle with the puncture needle 122. The sample needle holder 244 is attached to the sample needle axis 258 so that the sample needle holder 244, and thereby the sample needle, move when the sample needle axis 258 is driven or moved by the second motor 164*b* and the second drive shaft 238 thereof.

Figure 9:
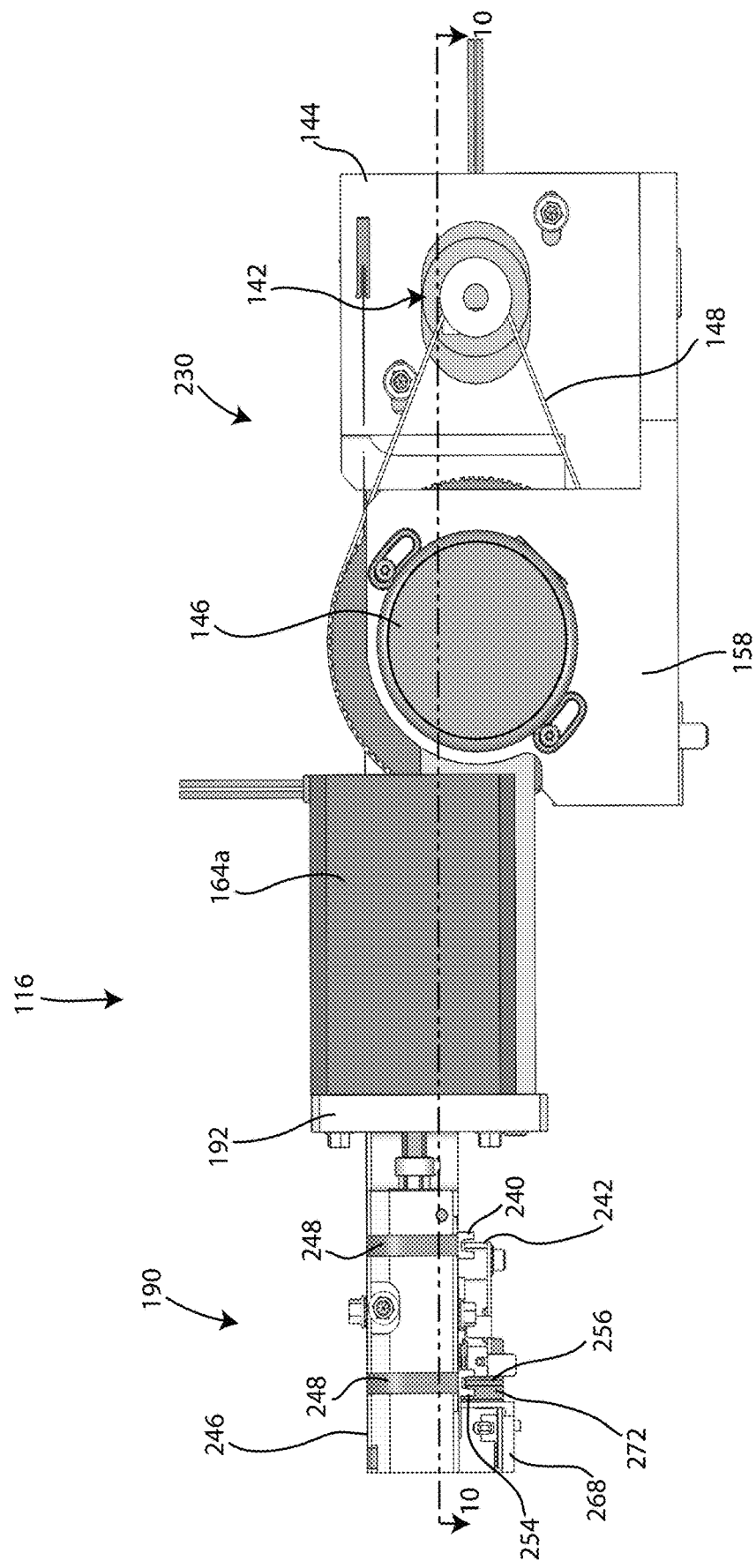
FIG. 9 depicts a top view of the needle arm of FIGS. 6 and 8, in accordance with one embodiment.

FIG. 9 depicts a top view of the needle arm 116, in accordance with one embodiment. Referring to both the perspective view of FIG. 6 and the top view of FIG. 9, a needle arm sensor system is shown. The sensor system includes a sample needle home sensor 240, a puncture needle home sensor 252, and a top sensor 252. The sensor system may further include a printed circuit board 246 configured to provide power, control signals and/or communication signals to and from the various sensors 240, 254, 252 in the sensor system. The printed circuit board 246 may be a flexible circuit board configured to flex with rotation of the needle assembly 190 about the vertical shaft 154. The printed circuit board 246 may be capable of performing its function without losing its signal and/or conductive integrity while being bent back and forth through the rotation of the needle assembly 190 about the vertical shaft 154 throughout the lifecycle of the needle arm 116. The sensor system and/or printed circuit board 246 and the sensors 240, 254, 252 may be in operable communication with a control system such as the data system 34, such that sensed information is provided to the data system 34 for processing.

The sample needle home sensor 240 is configured to sense movement of the sample needle axis 258 and/or determine when the sample needle axis 258 arrives in a home (top) position. The sample needle home sensor 240 may be configured to sense and/or determine that the sample needle has been moved in a vertical direction a predetermined distance to a sample needle home position. The sample needle holder 244 is connected to the sample needle axis 258 and moves with the sample needle axis 258. The sample needle holder 244 includes an extending projection 242 configured to move between the two prongs of the sample needle home sensor 240. Thus, when the sample needle axis 258 moves to a top home position, the extending projection 242 is positioned between the two prongs of the sample needle home sensor 240, which thereby senses that the sample needle axis 258 is in the home position. A connecting conductor 248 extends between the printed circuit board 246 and the sample needle home sensor 240 configured to provide power and/or other control or communication signals to and from the sample needle home sensor 240.

The puncture needle home sensor 252 is configured to sense movement of the puncture needle axis 260 and/or determine when the puncture needle axis 260 arrives in a home (top) position. The puncture needle home sensor 252 may be configured to sense and/or determine that the puncture needle 122 has been moved in a vertical direction a predetermined distance to a puncture needle home position. The puncture needle axis 260, and specifically the puncture needle coupling surface 272 thereof, includes an extending projection 256 configured to move between the two prongs of the puncture needle home sensor 252. Thus, when the puncture needle axis 260 moves to a top home position, the extending projection 256 is positioned between the two prongs of the puncture needle home sensor 252, which thereby senses that the puncture needle axis 260 is in the home position. A connecting conductor 248 extends between the printed circuit board 246 and the puncture needle home sensor 252 configured to provide power and/or other control or communication signals to and from the puncture needle home sensor 252.

The top sensor 254 of the sensor system is configured to sense when the stripper foot 262 is compressed by a predetermined amount. This predetermined amount may correspond to a force acting on the stripper foot 262 by a top of the sample vial. A service loop 250 may extend from the printed circuit board 246 to the top sensor 254 for providing power and/or other control or communication signals to and from the top sensor 254. The top sensor 254 may be a stripper foot movement sensor configured to determine that the stripper foot 262 has been moved in a vertical direction over a predetermined distance.

Figure 10:
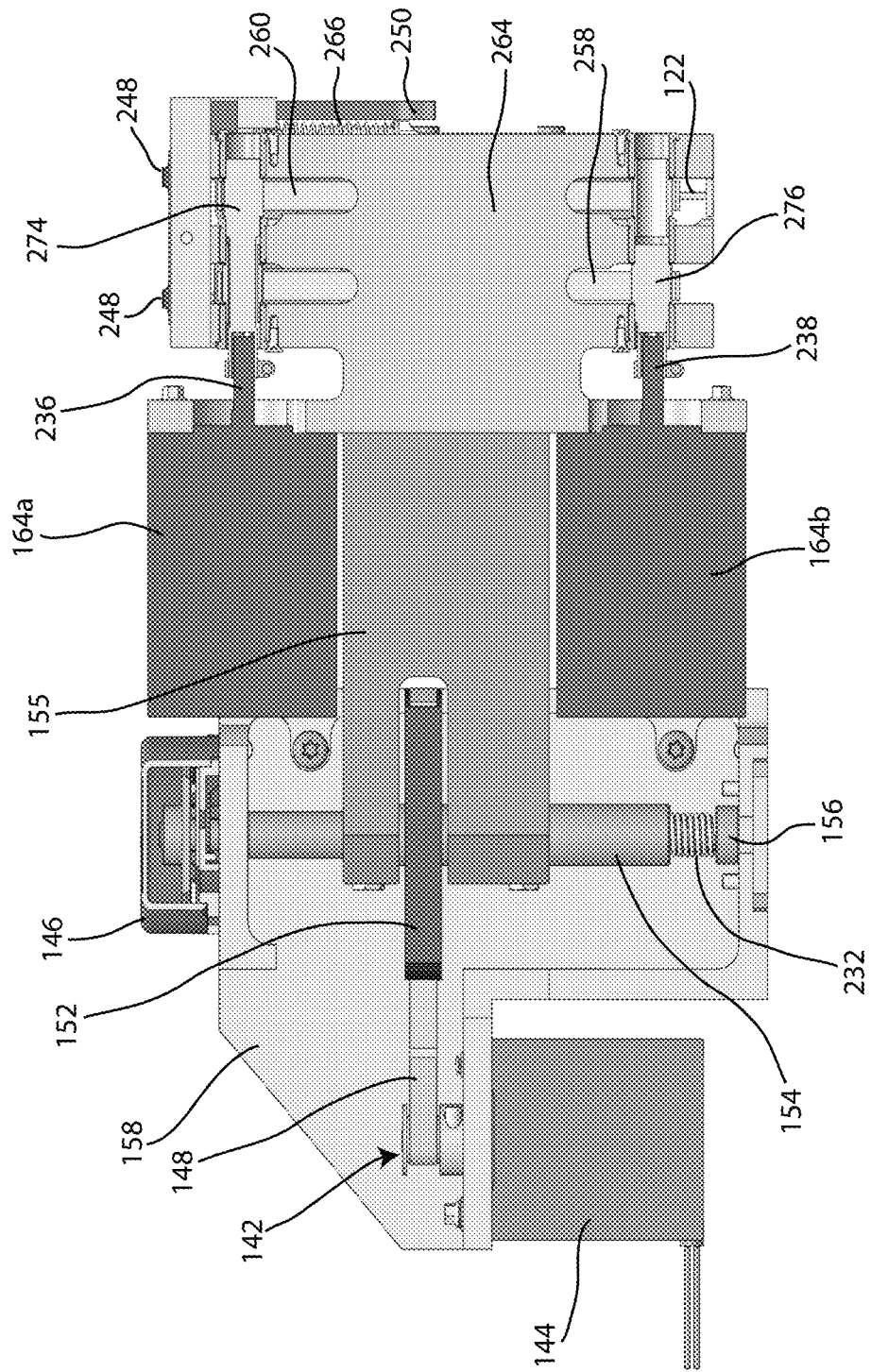
FIG. 10 depicts a side cross sectional view of the needle arm of FIGS. 6, 8 and 9, taken at arrows 10-10 in FIG. 9, in accordance with one embodiment.

FIG. 10 depicts a side cross sectional view of the needle arm 116, in accordance with one embodiment, taken at arrows 10-10 of FIG. 9. As shown, the drive system may include a system for converting the rotational motion of the drive shafts 236, 238 to vertical linear motion of the axis 258, 260. The first and second motors 164*a*, 164*b* may operate independently from each other such that the puncture needle 122 and a sample needle (not shown) are capable of independent vertical motion. The top drive shaft 236 is shown extending from the first motor 164*a* through an opening in the plate 192 of the housing 264. Similarly, the bottom drive shaft 238 is shown extending from the second motor 164*b* through an opening in the plate 192 of the housing 264. As shown, the top drive shaft 236 is attached to an engagement structure 274 that is configured to bypass the sample needle axis 258 and engage with the puncture needle axis 260 to convert rotational motion of the drive shaft 236 to linear vertical motion of the puncture needle axis 260. Similarly, the bottom drive shaft 238 is attached to an engagement structure 276 that is configured to engage with the sample needle axis 258 to convert rotational motion of the drive shaft 238 to linear vertical motion of the sample needle axis 258.

Figure 11:
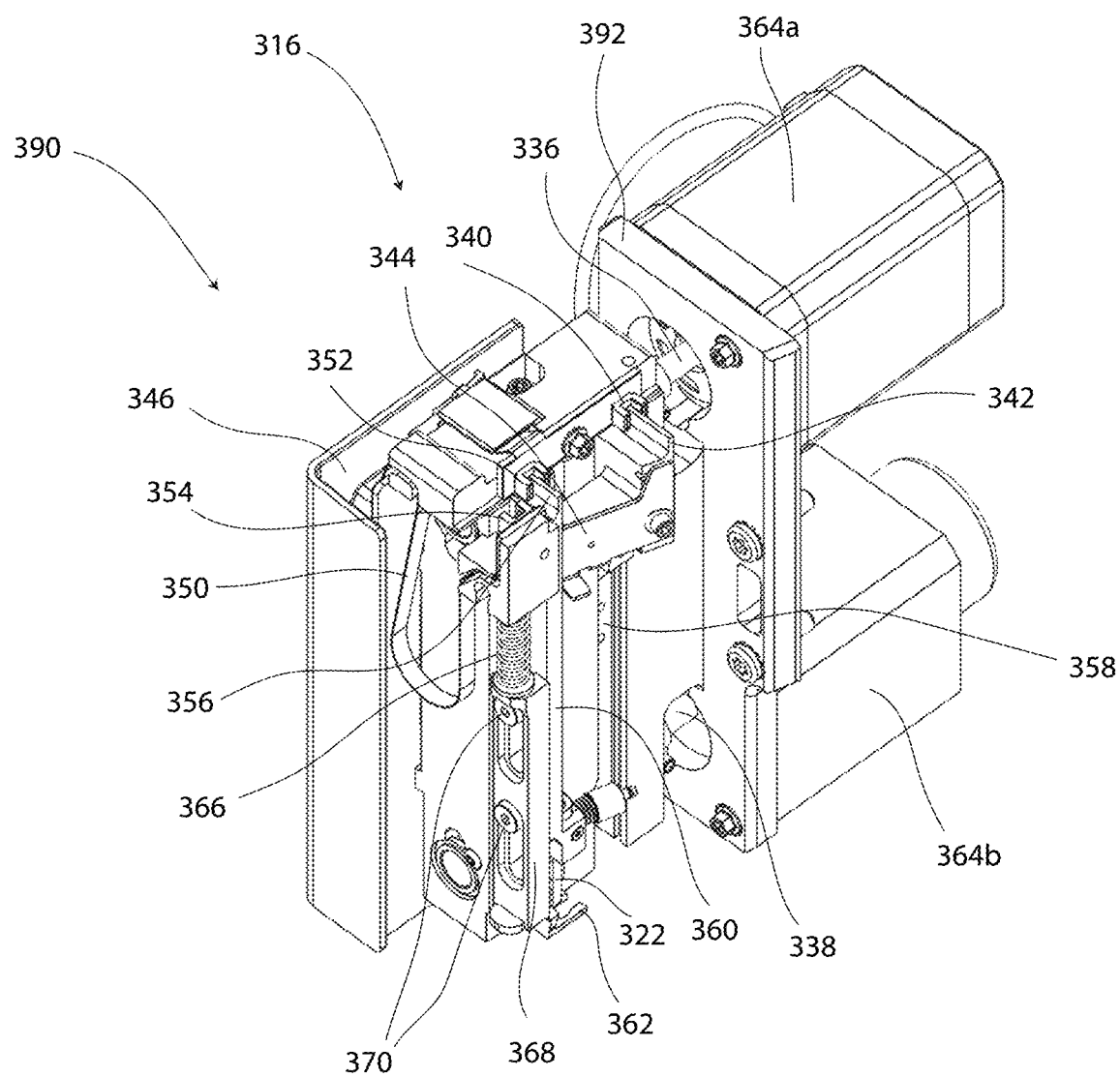
FIG. 11 depicts a perspective view of a needle arm with a needle mechanism base detached, in accordance with one embodiment.

FIG. 11 depicts a perspective view of a needle arm 316 with the needle mechanism base detached (such as the needle mechanism base 230), in accordance with one embodiment. The needle arm 316 may be the same or similar to the needle arm 116, described in detail hereinabove. Thus, the needle arm 316 includes a needle assembly 390 attached to two separate motors 364*a*, 364*b* configured to rotate two separate drive shafts. A first motor 364*a* is configured to rotate a first drive shaft 336 that enacts movement on a puncture needle 322. A second motor 364*b* is configured to rotate a second drive shaft 338 that enacts movement on a sample needle 361 (shown in FIGS. 13, 16 and 17). The puncture needle 322 may operate in conjunction with the sample needle 361 in order to puncture whatever material or membrane covers a sample vial or container 400 (shown in FIGS. 16 and 17). The two motors 364*a*, 364*b* may be configured to operate independently and may be controlled and programed by a control system and/or data system, such as the control and/or data system 34 described hereinabove, for operational routines as described herein and more particularly with respect to the methodology described and shown in FIGS. 18 and 19.

As shown in FIG. 11, a stripper foot axis 368 is attached to a stripper foot 362. The stripper foot axis 368 is movable relative to a puncture needle axis 360, via two couplings 370. The couplings 370 may include a top elongated vertical opening and a bottom elongated opening in the stripper foot axis 368 through which top and bottom respective pins extend. The top and bottom respective pins are attached to the puncture needle axis 360. The top and bottom elongated vertical openings cooperate with the pins so that the stripper foot axis 368 and the puncture needle axis 360 are connected or otherwise coupled in a manner that allows for vertical movement between the stripper foot axis 368 and the puncture needle axis 360. The maximum vertical movement between the stripper foot axis 368 and the puncture needle axis 360 is defined by the vertical length of the top and bottom elongated vertical openings in the stripper foot axis 368.

Thus, the stripper foot 362 is attached to the stripper foot axis 368 that includes a spring loaded end 366 having a spring mechanism. The spring mechanism may be configured to compress during downward movement of the stripper foot 362 and stripper foot axis 368. In use, the stripper foot 362 may contact the top of a sample vial or container 400 (shown in FIGS. 16 and 17), after which the puncture needle 322 may be pushed through a protective membrane of the sample vial. After the puncture needle 322 has punctured this top protective membrane, the puncture needle 322 must be retracted from the sample vial and protective membrane. The stripper foot 362 may be configured to provide a downward force on the top of the sample vial so that the puncture needle 322 may be retracted properly without sticking to the protective membrane of the sample vial. The stripper foot 362 includes an opening through which the puncture needle 322 is configured to extend during puncturing.

The sample needle 361 is located along the same vertical axis as the puncture needle 322. The sample needle 361 may be a needle having a smaller diameter than the puncture needle 322 such that the sample needle 361 is configured to extend through the larger diameter opening of the puncture needle 322. A needle holder 344 is located at a top of a sample needle axis 358. The sample needle holder 344 may be configured to removably receive the sample needle 361 at a location that aligns the sample needle with the puncture needle 322. The sample needle holder 344 is attached to the sample needle axis 358 so that the sample needle holder 344, and thereby the sample needle 361, move when the sample needle axis 358 is driven or moved by the second motor 364b and the second drive shaft 338 thereof.

The needle arm 316 includes an optical sensor system such as the sensor system of the needle arm 216 described hereinabove and shown in FIG. 9. The sensor system includes a sample needle home sensor 340, a puncture needle home sensor 352, and a top sensor 354. The sensor system may further include a printed circuit board 346 configured to provide power, control signals and/or communication signals to and from the various sensors 340, 354, 352 in the sensor system. The sensor system and/or printed circuit board 346 and the sensors 340, 354, 352 may be in operable communication with a control system such as the data system 34, such that sensed information is provided to the data system 34 for processing.

The sample needle home sensor 340 is configured to sense movement of the sample needle axis 358 and/or determine when the sample needle axis 358 arrives in a home (top) position. The sample needle home sensor 340 may be configured to sense and/or determine that the sample needle has been moved in a vertical direction a predetermined distance to a sample needle home position. The sample needle holder 344 is connected to the sample needle axis 358 and moves with the sample needle axis 358. The sample needle holder 344 includes an extending projection 342 configured to move between the two prongs of the sample needle home sensor 340. Thus, when the sample needle axis 358 moves to a top home position, the extending projection 342 is positioned between the two prongs of the sample needle home sensor 340, which thereby senses that the sample needle axis 358 is in the home position. A connecting conductor may extend between the printed circuit board 346 and the sample needle home sensor 340 configured to provide power and/or other control or communication signals to and from the sample needle home sensor 340.

The puncture needle home sensor 352 is configured to sense movement of the puncture needle axis 360 and/or determine when the puncture needle axis 360 arrives in a home (top) position. The puncture needle home sensor 352 may be configured to sense and/or determine that the puncture needle 322 has been moved in a vertical direction a predetermined distance to a puncture needle home position. The puncture needle axis 360 includes an extending projection 356 configured to move between the two prongs of the puncture needle home sensor 352. Thus, when the puncture needle axis 360 moves to a top home position, the extending projection 356 is positioned between the two prongs of the puncture needle home sensor 352, which thereby senses that the puncture needle axis 360 is in the home position. A connecting conductor extends between the printed circuit board 346 and the puncture needle home sensor 352 configured to provide power and/or other control or communication signals to and from the puncture needle home sensor 352.

The top sensor 354 of the sensor system is configured to sense when the stripper foot 362 is compressed by a predetermined amount. This predetermined amount may correspond to a force acting on the stripper foot 362 by a top of the sample vial. A service loop 350 may extend from the printed circuit board 346 to the top sensor 354 for providing power and/or other control or communication signals to and from the top sensor 354. The top sensor 354 may be a stripper foot movement sensor configured to determine that the stripper foot 362 has been moved in a vertical direction over a predetermined distance relative to the puncture needle axis and/or the rest of the needle arm 316.

Figure 12:
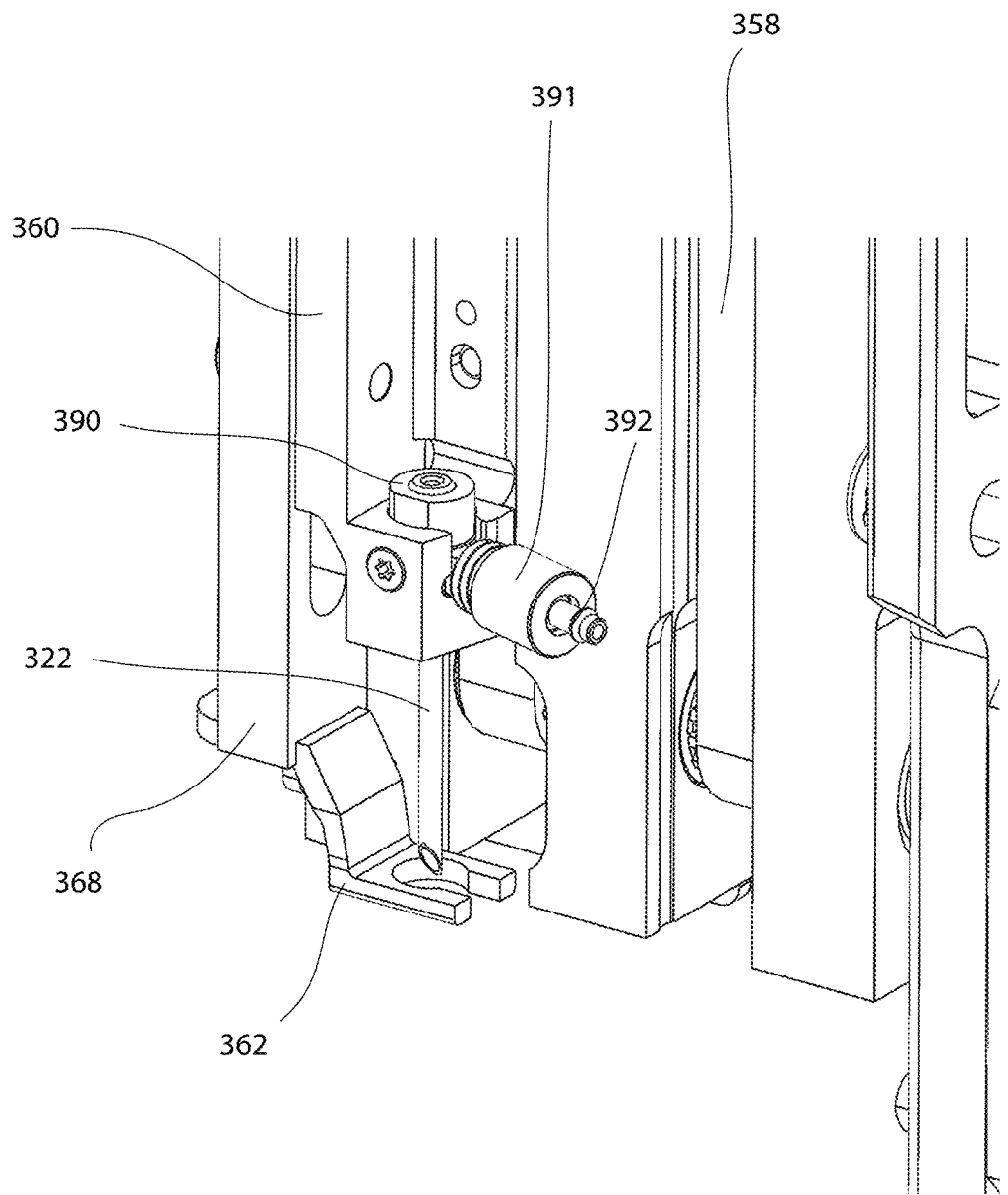
FIG. 12 depicts an enlarged perspective view of a puncture needle and stripper foot of the needle arm of FIG. 11, in accordance with one embodiment.
Figure 13:
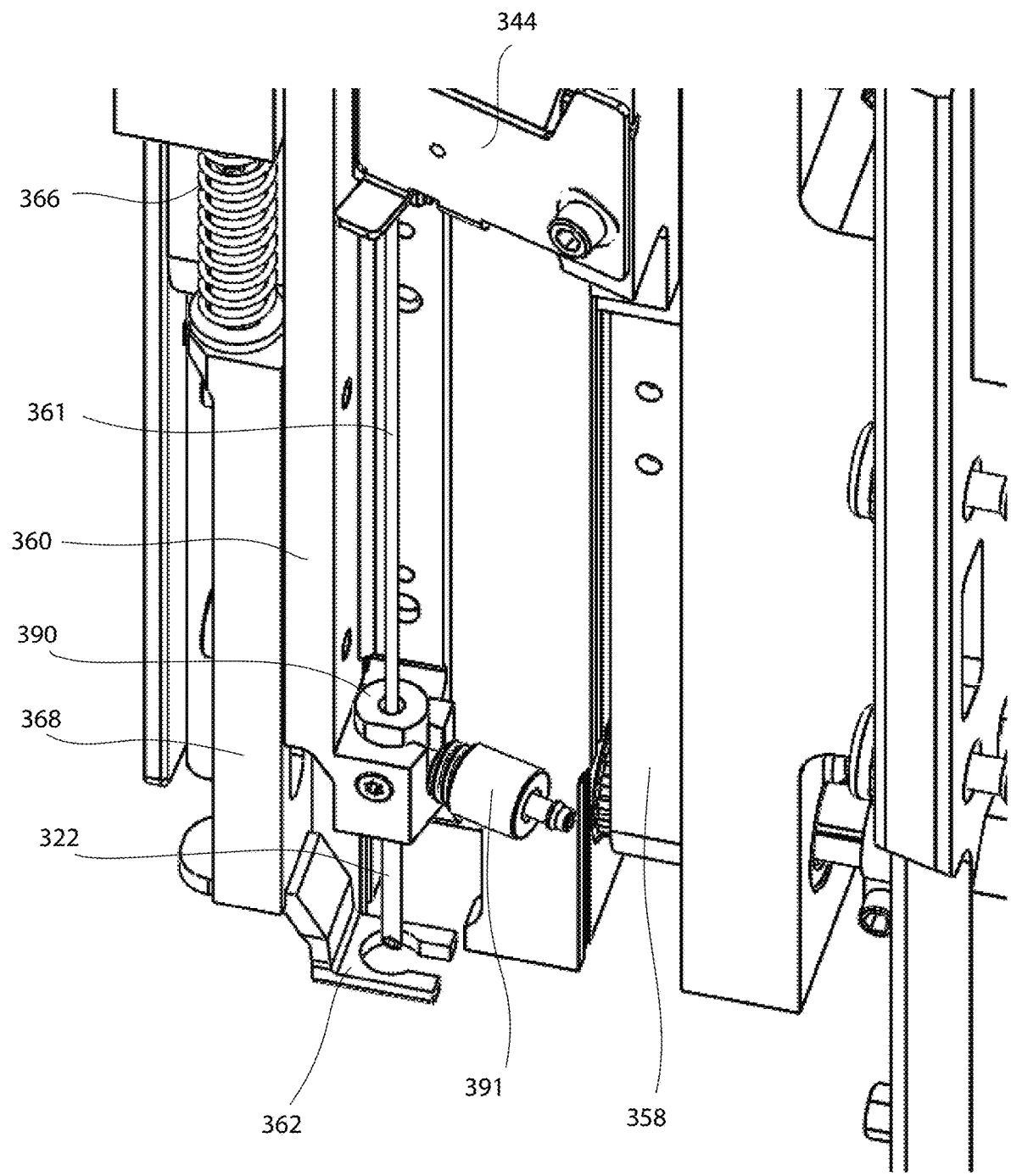
FIG. 13 depicts an enlarged perspective view of the puncture needle and stripper foot of FIG. 12 with a sample needle extending through the puncture needle, in accordance with one embodiment.

FIG. 12 depicts an enlarged perspective view of a puncture needle 322 and stripper foot 362 of the needle arm 316 of FIG. 11, in accordance with one embodiment. The puncture needle 322 includes a receiving interface 390 for engaging with the sample needle 361, as shown in FIG. 13. The stripper foot 362 is shown attached to the stripper foot axis 368, while the puncture needle 322 is shown attached to the puncture needle axis 360, each of which may be configured to move independently. As shown, a fluidic coupling 391 is included attachable such that a tube 392 of the fluidic coupling 391 extends into the opening of the puncture needle 322. The fluidic coupling 391 may be used to provide an inlet for a wash fluidic channel. The coupling 391 may allow for a tube (not shown) to be connected thereto and provide water or other wash fluid to wash the outside of the sample needle 361 and the inside of the puncture needle 322 in order to prevent sample carryover from one sample to the next.

FIG. 13 depicts an enlarged perspective view of the puncture needle 322 and the stripper foot 362 of FIG. 12 with the sample needle 361 extending through the puncture needle 322, in accordance with one embodiment. As described hereinabove, the sample needle 361 is connected to the sample needle axis 358 which provides independent axial movement of the sample needle 361 relative to the puncture needle 322 and the stripper foot 362. The puncture needle 322 is attached to the puncture needle axis 360 for independent movement. The puncture needle 322 and the sample needle 361 are each independently motor driven, as described hereinabove. In contrast, the stripper foot 362 is independently movable by movement of the stripper foot axis 362, but this movement is created only by upward force (or a removal thereof) on the stripper foot 362 caused by the stripper foot acting upon a top of the sample container 400.

Figure 14:
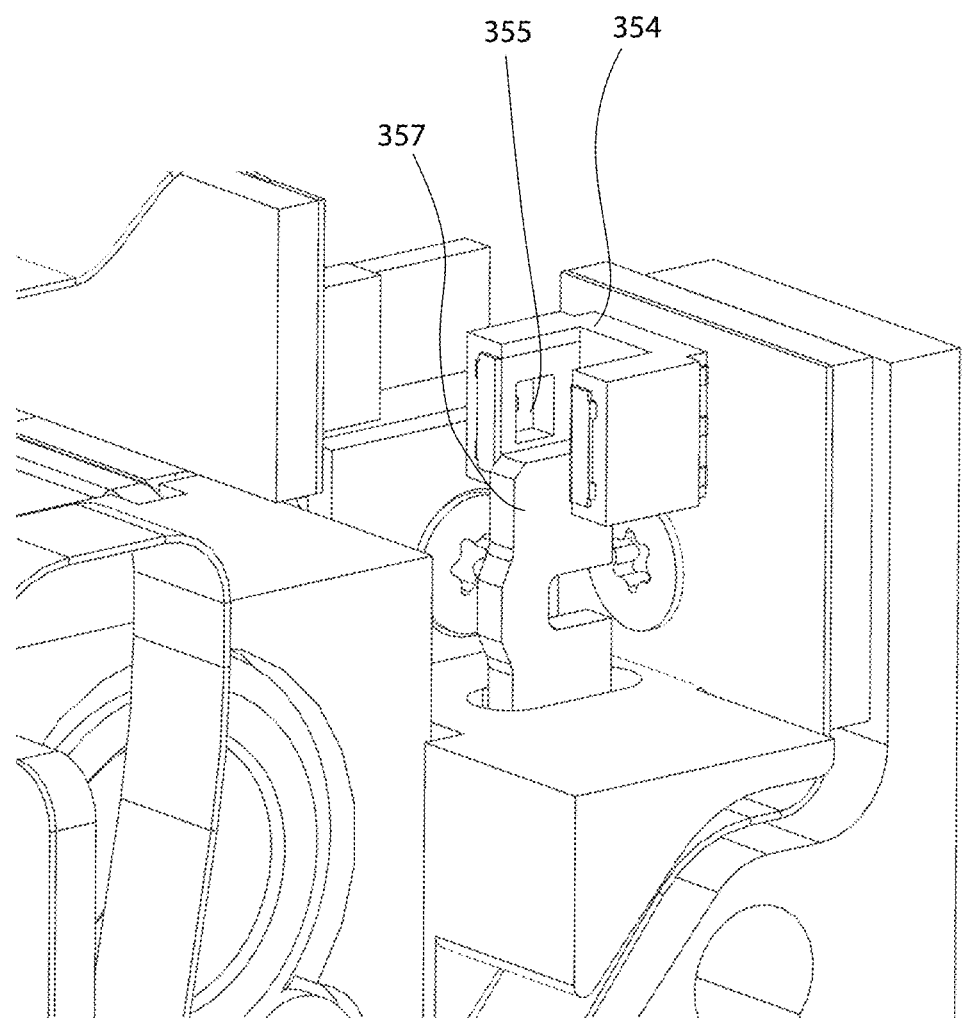
FIG. 14 depicts an enlarged perspective view of a portion of an optical sensor system of the needle arm of FIG. 11 that is in an open state, in accordance with one embodiment.
Figure 15:
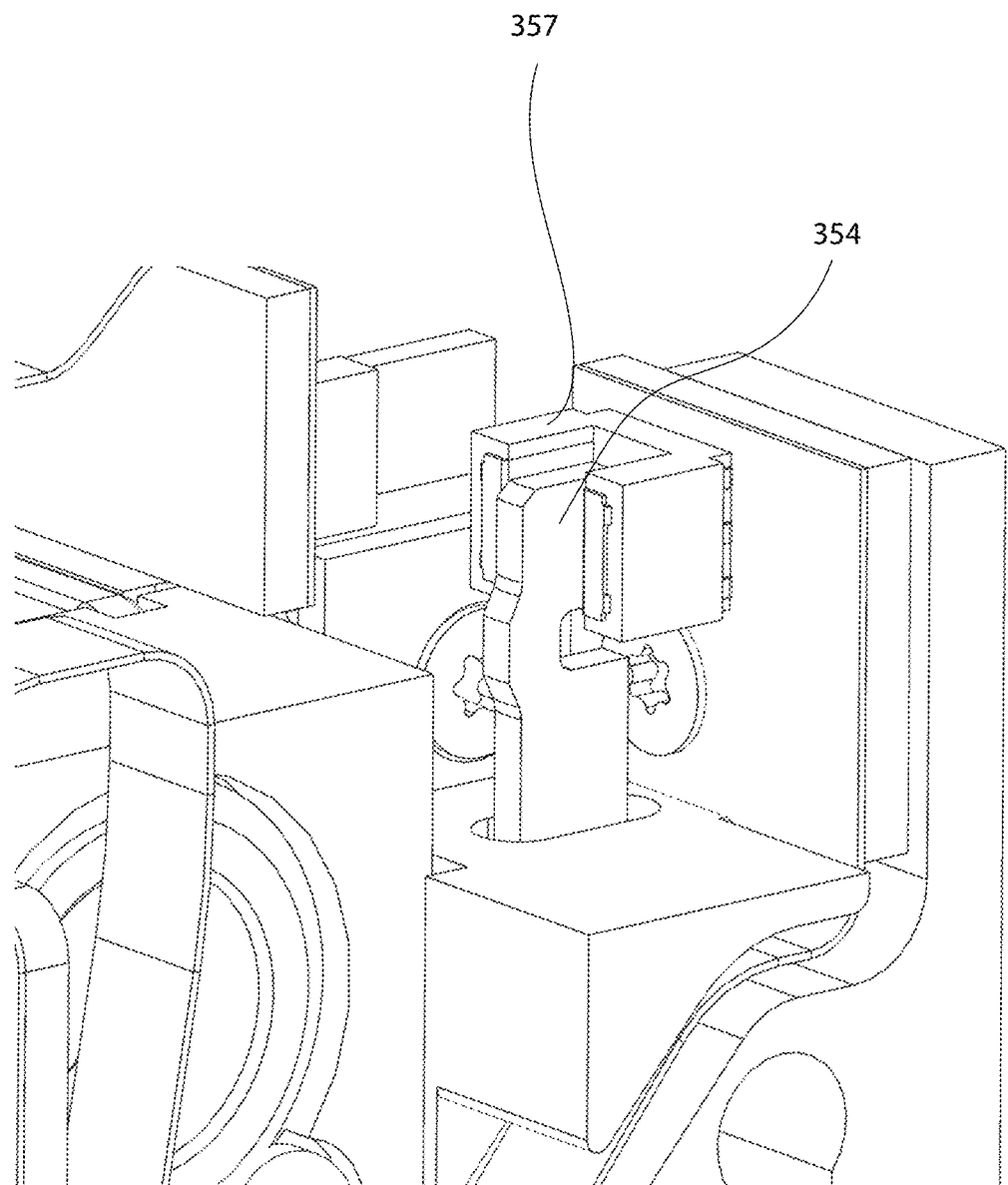
FIG. 15 depicts an enlarged perspective view of the portion of the optical sensor system of the needle arm of FIG. 11 that is in a closed state, in accordance with one embodiment.

FIG. 14 depicts an enlarged perspective view of a portion of the optical sensor system of the needle arm 316 of FIG. 11 that is in an open state, in accordance with one embodiment. Similarly, FIG. 15 depicts an enlarged perspective view of the portion of the optical sensor system of the needle arm 316 of FIG. 11 that is in a closed state, in accordance with one embodiment. As shown in FIGS. 14 and 15, the top sensor 354 is configured to sense movement of the stripper foot 362 and/or the stripper foot axis 368 by an optical detector 355 which is capable of detecting when a flag 358 closes the sensor (when the stripper foot experiences upward pressure). The flag 358 is a thin structure which extends from the stripper foot axis 368 such that when the stripper foot 362 is compressed, the stripper foot axis 368 moves upward with the flag 358, causing the top sensor 354 to become closed as shown in FIG. 15. When the stripper foot 362 returns to an uncompressed state, the flag 358 returns to the open (downward) or home position, as shown in FIG. 14. The top sensor 354 and the open and closed states thereof will be described in detail herein below with respect to the methodology described herein.

Figure 16:
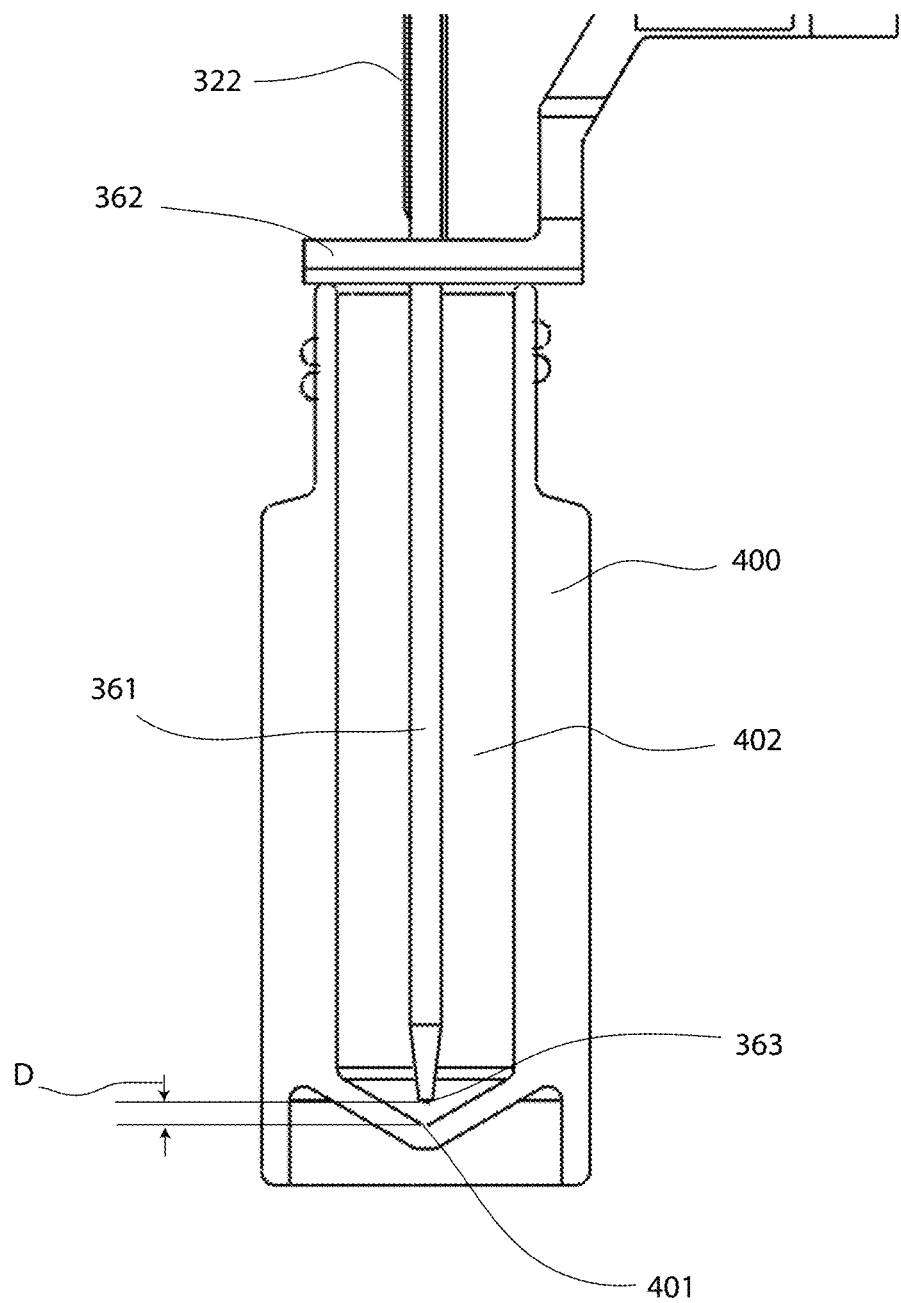
FIG. 16 depicts a side cutaway view of the sample needle of FIG. 13 within a sample container, in accordance with one embodiment.
Figure 17:
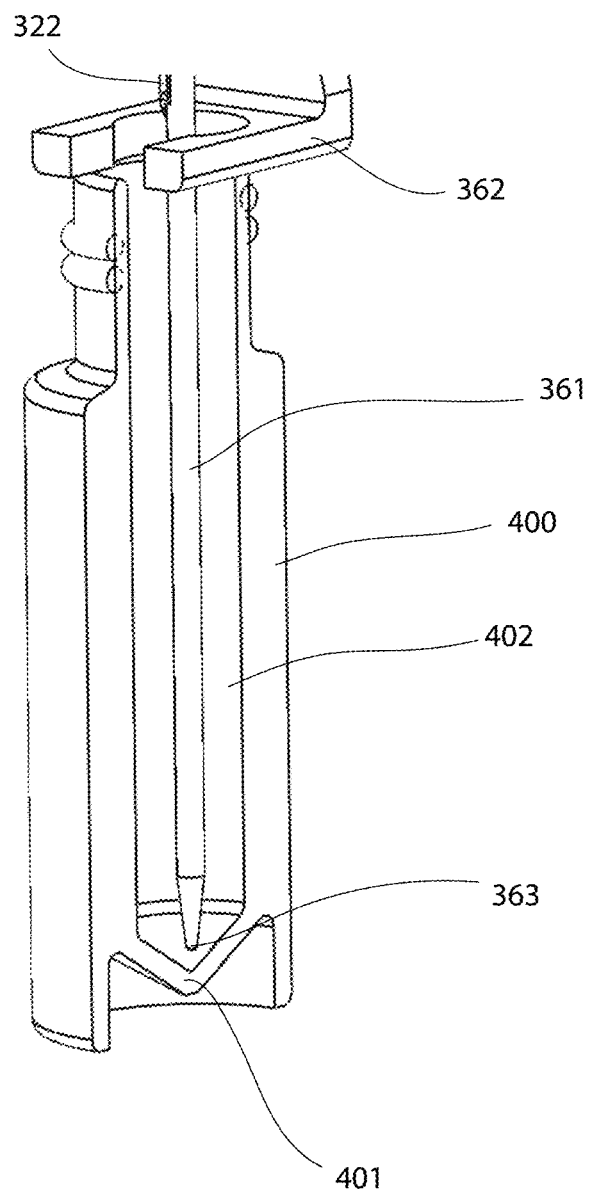
FIG. 17 depicts a perspective cutaway view of the sample needle within the sample container of FIG. 16, in accordance with one embodiment.

FIG. 16 depicts a side cutaway view of the sample needle 361 of FIG. 13 within a sample container 400, in accordance with one embodiment. FIG. 17 depicts a perspective cutaway view of the sample needle 361 within the sample container 400 of FIG. 16, in accordance with one embodiment. As shown, the sample container 400 includes a chamber 402 within which a sample may be contained. The chamber 402 of the sample container 400 includes a bottom 401. The bottom 401 of the chamber 402 shown includes a conical bottom which extends to a nadir. However, the invention is not limited to this embodiment, and any chamber dimensions are contemplated. In the position shown in FIGS. 16 and 17, a tip 363 of the sample needle 361 is located a short distance D from the bottom 401 of the chamber 402. This may be an end position of the methodology described herein below, after which the exact location of the bottom 401 of the chamber 402 is determined, and after which the sample needle is moved the predetermined distance D above the bottom 401 so that the tip 363 of the sample needle 361 is extremely close but not touching the bottom 401 of the chamber 402. As contemplated hereinbelow, it is possible to move the sample needle 361 so that the tip 363 touches the bottom 401 of the chamber 402 and thereby causes some downward deflection on the sample platter 110 (shown hereinabove in FIGS. 3-5).

Figure 18:
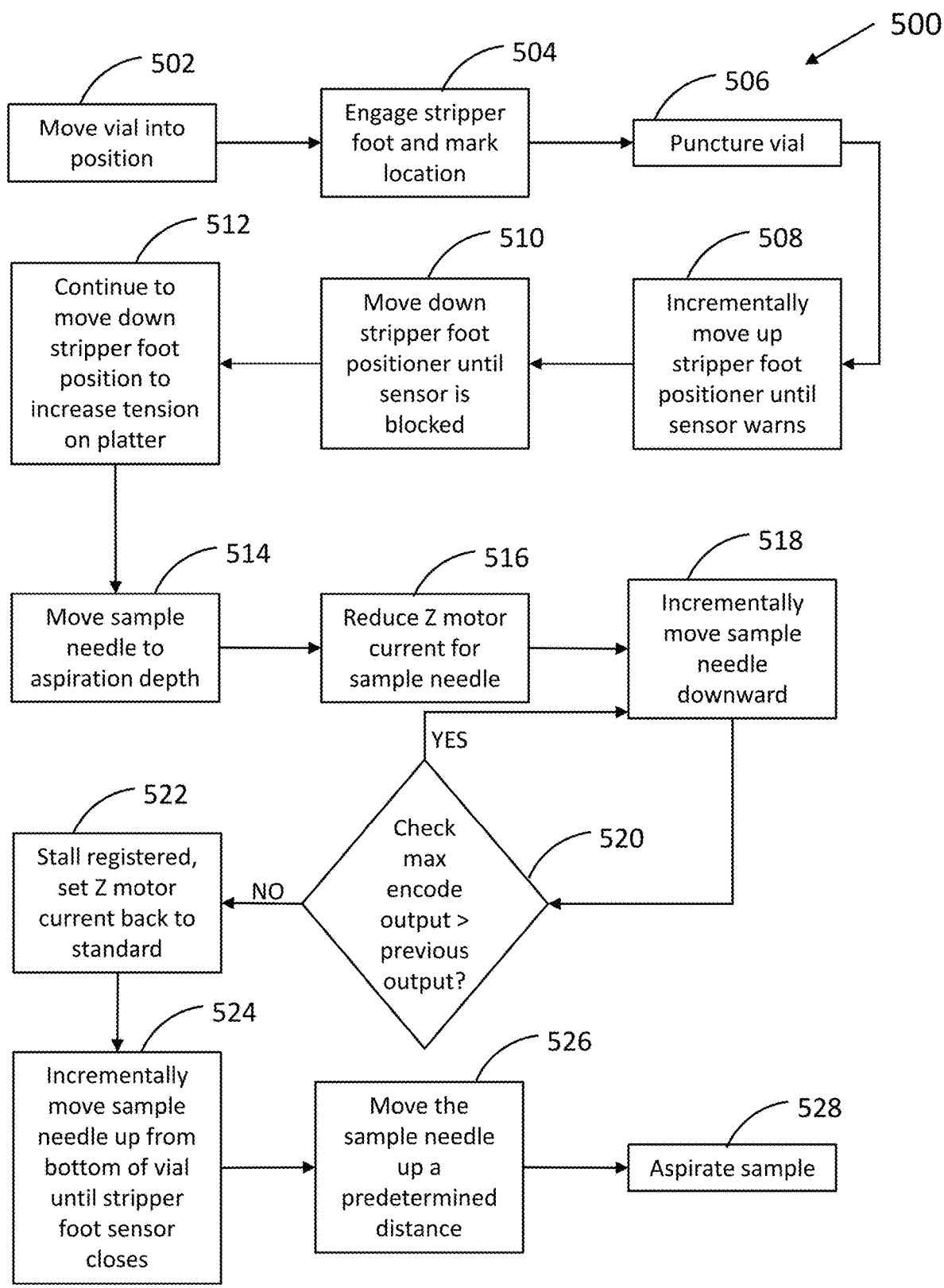
FIG. 18 depicts an exemplary method of aspirating a sample, in accordance with one embodiment.

FIG. 18 depicts an exemplary method 500 of aspirating a sample, in accordance with one embodiment. In accordance with the method 500, a first step 502 includes moving a vial or container, such as the container 400, into position relative to a sample aspiration system, such as the needle arm 316 or the needle arm 216. In order to accomplish this first step, any type of sample movement may occur, such as automatic movement of a sample platter in a sample chamber, such as the sample platter 110 of the sample manager 14. Similarly, the sample aspiration system may also move, such as by rotating the needle arm 316 as described herein.

The next step 504 of the method 500 includes engaging the stripper foot with a top of the vial, such that a detector determines that a stripper foot is engaged. For example, this may be accomplished by the stripper foot causing the flag 357 to close an optical sensor, such as the top sensor 354, as shown in FIG. 15 and described hereinabove. At this point, locations of various components of the needle arm 316 may be taken or marked by a control system, such as the data system 34. For example, the position of the puncture needle axis 360 as moved by the first motor 364a may be noted, saved, or otherwise marked. Once this position is marked, a step 506 of the method 500 occurs, in which the vial is punctured by engagement with the puncture needle 322. In order to accomplish step 506, the puncture needle axis 360 is moved even further downward by the first motor 364a.

At a next step 508, the puncture needle motor is configured to move up a stripper foot positioning mechanism, such as the puncture needle axis 366. This movement may be performed incrementally until pressure on the stripper foot 362 is released and the top sensor 354 is once again in an open state. From here, the stripper foot positioning mechanism (i.e. the puncture needle axis 366 in the embodiment shown hereinabove) is once again moved downward so that the top sensor 354 is once again blocked at a step 510 of the method 500. This moving back and forth after puncturing may be configured to re-determine a location under which the stripper foot 362 is under tension after the vial is punctured. From this point where the top sensor 354 is once again blocked, the method 500 may include a step 512 of applying by the system a further predetermined amount of additional or further pressure by providing more downward motion with the first motor 364a on the puncture needle axis 366. For example, the first motor 364a may be configured to move 4 additional steps down. This additional downward force may be configured to place the sample platter 110 under tension by the force applied by the stripper foot 362 on the sample container 400, the sample container 400 on a sample container holder (not shown), and the sample container holder onto the sample platter 110.

At this point in the method 500, the stripper foot 362 may be placing a downward force on the sample platter 110 in this manner. Any further deflection of the sample platter later caused by pressing the tip 363 of the sample needle 361 onto the bottom 401 of the sample container 400 will cause further deflection of the sample platter 110 and cause the stripper foot pressure to be reduced, thereby causing the top sensor 354 to open once again, as shown in FIG. 14.

From this position, the method 500 includes a step 514 of moving the sample needle 361 to a predetermined aspiration depth somewhere within the chamber 402. The aspiration depth at this stage may be a predictive or guessed depth that gets the tip 363 of the sample needle 361 close to the bottom 401 of the chamber 402. However, this aspiration depth may not be precise or a fully known distance between the bottom 401 of the chamber 402 and the tip 363 of the sample needle 361. Once moved into the chamber 402 by the sample needle 361 in this manner, a next step 516 of the method 500 includes reducing current to the motor that moves the sample needle 361, such as the second motor 364b as described hereinabove.

With the current reduced, the method 500 includes a step 518 of incrementally moving the sample needle 361 downward, by the second motor 364b. With each incremental motor current attempting to move the sample needle 361 taken in step 518, the encoder output is checked at a step 520 to see if there has been an actual movement by the sample needle 361 in the vertical direction. If there is movement, the current remains low and the step 518 is repeated within another incremental move downward for the sample needle 361 attempted by the second motor 364b. If there is no movement detected and the encoder output is not greater than the previous output (i.e. no downward movement of the sample needle 361) despite the attempt by the second motor 364*b* to move the sample needle 361, then a stall is registered by the system and the method 500 moves to the step 522 in which the current to the second motor 364*b* is set back to standard.

At this point in the method 500, the stripper foot 362 has placed an initial force on the sample vial causing a deflection in the sample platter 110 and putting the sample platter 110 under tension. Next, the sample needle 361 has been incrementally moved under low current to find the bottom. The low current may be low enough that a touchdown of the tip 363 of the needle 361 to the bottom 401 of the sample container 400. This may release the tension on the stripper foot 362, thereby opening the top sensor 354. Instead, the sample needle has replaced the source of the tension on the sample container 400 and thereby the sample platter 110. Thus, when the low current motor output of the second motor 364*b* does not produce movement of the sample needle 361, the system can determine that the tip 363 of the sample needle 361 is at the bottom 401 and is under the tension previously created by the stripper foot 362.

From this position, a step 524 includes incrementally moving up the tip 363 of the sample needle 361 from the bottom 401 of the container 400 until the top sensor 354 becomes closed once again, as shown in FIG. 15, due to the tension source being transferred from the tip 363 of the sample needle 361 back to the stripper foot 362. At the position the top sensor 354 becomes closed, the tip of the sample needle 361 may be barely in contact or literally proximate the bottom 402 of the sample container 400. From this point, the method 500 may include a step 526 of incrementally moving the sample needle upward a predetermined distance D. This predetermined distance may be an extremely small distance configured to allow the needle to aspirate extremely close to the bottom of the sample container. For example, the predetermined distance may be less than 1.1 mm prior to the aspirating the sample. The method 500 then includes a step 528 of aspirating the sample from this predetermined distance.

Advantages of the above-described method include always knowing your aspiration depth. This may be important in cases where a composition of a sample may not be constant across its depth. Further, the above-described method provide a method to get extremely close to a bottom, but not touching the bottom, during aspiration. This may allow for a greater amount of usable sample in a container, which is particularly important when the container is not filled with sample, but rather the sample is smaller in size. Thus, the method provides a way to consistently provided for less than 1 uL residual of sample after aspiration, if needed.

Figure 19:
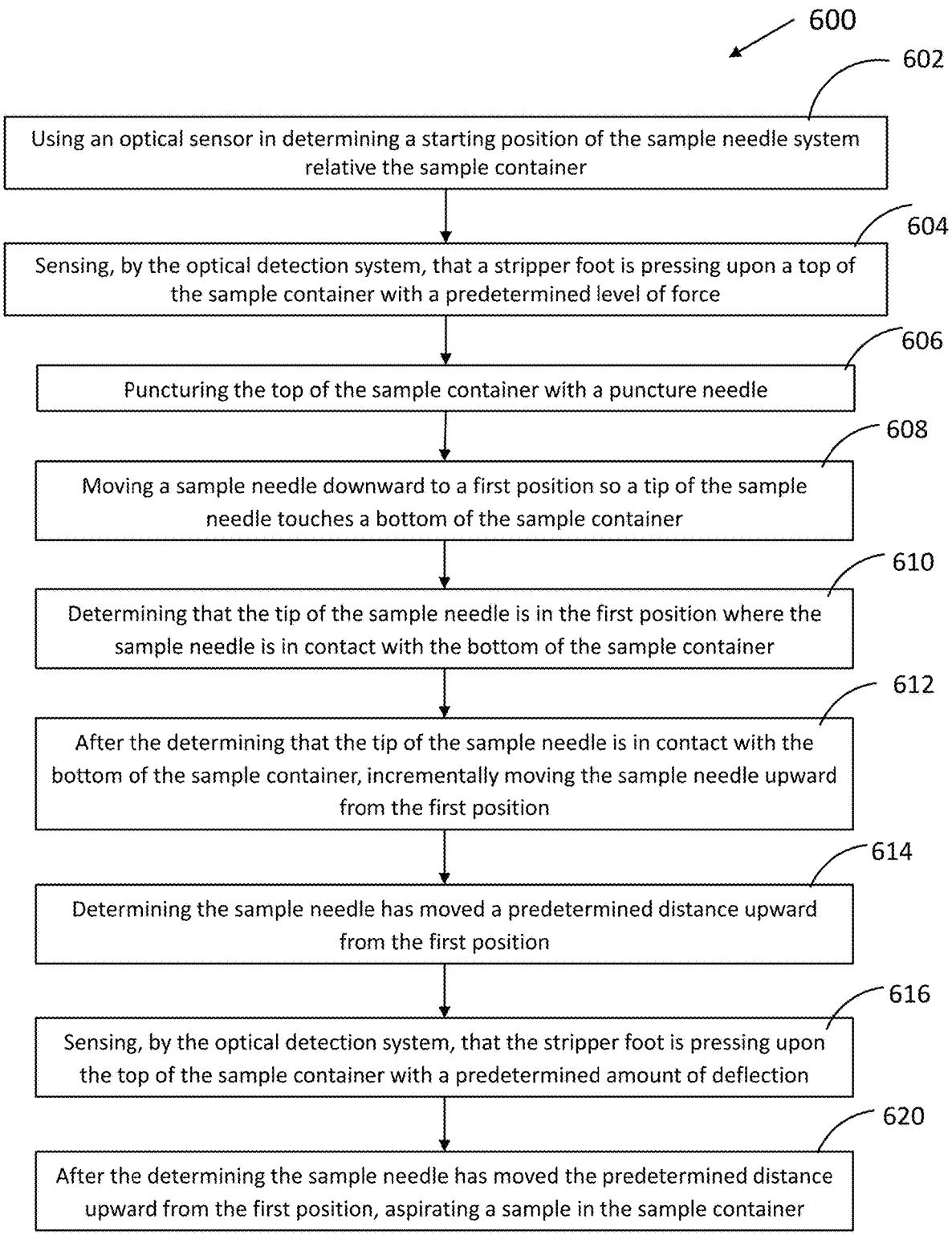
FIG. 19 depicts another exemplary method of aspirating a sample, in accordance with one embodiment.

FIG. 19 depicts another exemplary method 600 of aspirating a sample, in accordance with one embodiment. The method 600 includes a first step 602 of using an optical sensor in determining a starting position of the sample needle system relative the sample container. The method 600 includes a second step 604 of sensing, by the optical detection system, that a stripper foot is pressing upon a top of the sample container with a predetermined amount, such as a predetermined distance or level of force. The method 600 includes another step 606 of puncturing the top of the sample container with a puncture needle. The method 600 includes a further step 608 of moving a sample needle downward to a first position so a tip of the sample needle touches a bottom of the sample container. Still further, the method 600 includes a step 610 of determining that the tip of the sample needle is in the first position where the sample needle is in contact with the bottom of the sample container. The method 600 includes a step 612 which occurs after the determining that the tip of the sample needle is in contact with the bottom of the sample container. The step 612 includes incrementally moving the sample needle upward from the first position. The method 600 includes a next step 614 of determining the sample needle has moved a predetermined distance upward from the first position. The method 600 includes a next step 616 of sensing, by the optical detection system, that the stripper foot is pressing upon the top of the sample container with the predetermined amount of deflect. In other embodiments it may also be possible to sense that the stripper foot is pressing upon the top of the sample container with a predetermined level of force. The method 600 finally includes a step 618 of aspirating a sample in the sample container after the determining the sample needle has moved the predetermined distance upward from the first position.

While the invention has been shown and described with reference to specific embodiments, it should be understood by those skilled in the art that various changes in form and detail may be made therein without departing from the spirit and scope of the invention as recited in the accompanying claims.

What is claimed is:

1. A method of aspirating a sample, the method comprising:
   moving a sample needle downward to a first position so a tip of the sample needle touches a bottom of a sample container;
   reducing current in a motor controlling movement of the sample needle during the moving the sample needle downward toward the bottom of the sample container;
   determining that the tip of the sample needle is in the first position where the sample needle is in contact with the bottom of the sample container;
   after the determining that the tip of the sample needle is in contact with the bottom of the sample container, incrementally moving the sample needle upward from the first position;
   determining the sample needle has moved a predetermined distance upward from the first position; and
   after the determining the sample needle has moved the predetermined distance upward from the first position, aspirating a sample in the sample container.

2. The method of claim 1, further comprising:
   before the moving the sample needle downward to the first position so the tip of the sample needle touches the bottom of the sample container, using an optical sensor in determining a starting position of the sample needle system relative to the sample container.

3. The method of claim 1, further comprising:
   using an optical detection system in determining that the sample needle has moved the predetermined distance upward from the first position.

4. The method of claim 3, further comprising:
   prior to moving the sample needle downward so the tip of the sample needle touches the bottom of the sample container: sensing, by the optical detection system, that a stripper foot is pressing upon a top of the sample container with a predetermined amount; and
   puncturing the top of the sample container with a puncture needle.

5. The method of claim 4, wherein the determining the sample needle has moved the predetermined distance upward from the first position further comprises:

sensing, by the optical detection system, that the stripper foot is pressing upon the top of the sample container.

6. The method of claim 5, wherein a spring operably attached to the stripper foot deflects a predetermined amount.

7. The method of claim 1, further comprising:
using an encoder system in moving the sample needle and determining that the tip of the sample needle is in contact with the bottom of the sample container.

8. The method of claim 7 wherein the determining that the tip of the sample needle is in contact with the bottom of the sample container further comprises:
moving the sample needle a pre-specified aspiration depth within the sample container;
incrementally moving the sample needle downward toward the bottom of the sample container; and
determining that an encoder output of a latter incremental step has not changed relative to an encoder output of a prior incremental step.

9. The method of claim 1, further comprising:
increasing the current in the motor controlling movement of the sample needle after the determining that the tip of the sample needle is in contact with the bottom of the sample container.

10. The method of claim 1, further comprising:
accounting for a deflection of a sample platter upon which the sample container rests caused by contact of the tip of the sample needle touching the bottom of the sample container, prior to the aspirating the sample in the sample container.

11. The method of claim 10, further comprising:
compensating for a relative position between the sample container and the sample platter in determining the predetermined distance upward.

12. The method of claim 1, wherein a control system is configured to control the moving of the sample needle, the aspirating the sample, and configured to perform the determining that the tip of the sample needle is in contact with the bottom of the sample container and the determining that the sample needle has moved the predetermined distance upward from the first position.

13. The method of claim 1, wherein the sample needle is included in a sample needle carriage assembly that includes a stripper foot, puncture needle and separate drive motors for the sample needle and the puncture needle.

14. The method of claim 1, wherein a distance between the tip of the sample needle and the bottom of the sample container is less than 1.1 mm prior to the aspirating the sample.

15. The method of claim 14, further comprising minimizing a residual volume to less than 1 uL by ensuring the tip of the sample needle remains within 1.1 mm from the bottom of the sample container prior to the aspirating the sample.

16. A liquid chromatography system configured to perform the method of claim 1, the liquid chromatography system comprising:
a solvent delivery system;
a sample manager having a thermal chamber;
a sampling mechanism mounted within the thermal chamber, the sampling mechanism including a sample platter mounted in the thermal chamber, and a sample delivery system in fluidic communication with the solvent delivery system, the sample delivery system including the sample needle, the sample delivery system configured to transfer the sample from the sample container located in the sample platter into a chromatographic flow stream;
a liquid chromatography column located downstream from the solvent delivery system and the sample delivery system; and
a detector located downstream from the liquid chromatography column.

17. The liquid chromatography system of claim 16, further comprising:
a control system that is configured to control the moving of the sample needle, the aspirating the sample, and configured to perform the determining that the tip of the sample needle is in contact with the bottom of the sample container and the determining that the sample needle has moved the predetermined distance upward from the first position.

18. A liquid chromatography sample manager configured to perform the method of claim 1, comprising:
a thermal chamber; and
a sampling mechanism mounted within the thermal chamber, the sampling mechanism including a sample platter mounted in the thermal chamber, and a sample delivery system in fluidic communication with a solvent delivery system, the sample delivery system including the sample needle, the sample delivery system configured to transfer the sample from the sample container located in the sample platter into a chromatographic flow stream.

19. The liquid chromatography sample manager of claim 18, further comprising:
a control system that is configured to control the moving of the sample needle, the aspirating the sample, and configured to perform the determining that the tip of the sample needle is in contact with the bottom of the sample container and the determining that the sample needle has moved the predetermined distance upward from the first position.

* * * * *